(12) United States Patent
Ai et al.

(10) Patent No.: US 12,132,853 B2
(45) Date of Patent: Oct. 29, 2024

(54) ENHANCING A VIRTUAL COMMUNICATION WITH A MOBILE COMMUNICATION DEVICE

(71) Applicant: Huawei Technologies Co., Ltd., Shenzhen (CN)

(72) Inventors: Jiang Ai, San Jose, CA (US); MyungJin Kim, Santa Clara, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 357 days.

(21) Appl. No.: 17/624,189

(22) PCT Filed: Jul. 3, 2019

(86) PCT No.: PCT/US2019/040649
§ 371 (c)(1),
(2) Date: Dec. 30, 2021

(87) PCT Pub. No.: WO2020/101758
PCT Pub. Date: May 22, 2020

(65) Prior Publication Data
US 2022/0368788 A1    Nov. 17, 2022

(51) Int. Cl.
*H04M 1/04* (2006.01)
*H04M 1/02* (2006.01)

(52) U.S. Cl.
CPC ........... *H04M 1/04* (2013.01); *H04M 1/0208* (2013.01)

(58) Field of Classification Search
CPC ........ F16M 11/10; F16M 11/18; F16M 13/00; F16M 13/005; G06F 1/1626; G06F 1/1632; G06F 1/166; G06F 2200/1633; H04M 1/0202; H04M 1/0208; H04M 1/0214; H04M 1/04
USPC ........................................ 455/575.1
See application file for complete search history.

(56) References Cited

U.S. PATENT DOCUMENTS

| | | | |
|---|---|---|---|
| 2006/0082518 A1 | 4/2006 | Ram | |
| 2006/0240874 A1* | 10/2006 | Yiu | H04M 1/021 455/566 |
| 2009/0231797 A1* | 9/2009 | Kim | G06F 1/1626 16/297 |
| 2009/0321609 A1* | 12/2009 | Wang | H04M 1/0297 248/685 |

(Continued)

FOREIGN PATENT DOCUMENTS

| CN | 102594990 A | 7/2012 |
|---|---|---|
| CN | 206237474 U | 6/2017 |

(Continued)

*Primary Examiner* — Tan H Trinh
(74) *Attorney, Agent, or Firm* — Slater Matsil, LLP

(57) ABSTRACT

In an example implementation, a mobile communication device assembly includes a housing having an opening configured and sized to support a display screen of a mobile communication device. A controller is mounted in the housing and configured to communicably couple to the mobile communication device. An angular adjustment assembly is mounted in the housing and including a first motor electrically coupled to the controller; a first gear assembly driveably coupled to the first motor; and a support member coupled to the first gear assembly and extendable, with the first gear assembly, from a first position flush with the housing to a second position angularly extended from the housing.

17 Claims, 15 Drawing Sheets

(56) References Cited

U.S. PATENT DOCUMENTS

| | | | |
|---|---|---|---|
| 2011/0156556 A1* | 6/2011 | Wu | H04M 1/0208 |
| | | | 312/309 |
| 2014/0009561 A1 | 1/2014 | Sutherland et al. | |
| 2015/0177784 A1* | 6/2015 | Varadarajan | G06F 1/1626 |
| | | | 248/688 |
| 2016/0305646 A1 | 10/2016 | Marcus et al. | |
| 2017/0179989 A1 | 6/2017 | An et al. | |
| 2019/0155334 A1* | 5/2019 | Feng | G06F 1/166 |
| 2020/0405403 A1* | 12/2020 | Shelton, IV | A61B 17/3421 |

FOREIGN PATENT DOCUMENTS

| | | |
|---|---|---|
| CN | 107390723 A | 11/2017 |
| CN | 207652515 U | 7/2018 |
| KR | 20160004443 U | 12/2016 |

\* cited by examiner

ENHANCING A VIRTUAL COMMUNICATION WITH A MOBILE COMMUNICATION DEVICE

CROSS-REFERENCE TO RELATED APPLICATIONS

This application is a national phase filing under section 371 of PCT Application No. PCT/US2019/040649, filed on Jul. 3, 2019 and entitled "Enhancing a Virtual Communication with a Mobile Communication Device," which is hereby incorporated by reference herein as if reproduced in its entirety.

TECHNICAL FIELD

This disclosure relates to systems and methods for enhancing a virtual communication with a mobile communication device.

BACKGROUND

Mobile communication device (e.g., cellphone, smartphone, tablet) video calling and conference calling has many benefits that voice-only calls may not possess, such as clear message communication, communication of surroundings and visuals, and communication of intent of expression, such as through body language. In some cases, during video calling, a user needs to hand-hold the mobile communication device or use "selfie stick" during the call, thereby making it more difficult to place the device properly and continuously and optimally frame participants on the screen of the device.

SUMMARY OF THE INVENTION

The present disclosure systems and methods for enhancing a virtual communication with a mobile communication device.

In a first implementation, an mobile communication device assembly includes a housing that comprises an opening configured and sized to support a display screen of a mobile communication device; a controller mounted in the housing and configured to communicably couple to the mobile communication device; and an angular adjustment assembly mounted in the housing and including a first motor electrically coupled to the controller; a first gear assembly driveably coupled to the first motor; and a support member coupled to the first gear assembly and extendable, with the first gear assembly, from a first position flush with the housing to a second position angularly extended from the housing.

In a second implementation, a method for orienting a mobile communication device includes: receiving, at a controller mounted in a housing of a mobile communication device assembly, a command from at least one of a human user or a mobile communication device positioned in the mobile communication device assembly; based on the command, operating, by the controller, a first motor mounted in a housing of the mobile communication device assembly; extending a support member coupled to the first motor through a first gear assembly mounted in the housing from a first position flush with the housing to a second position angularly extended from the housing to contact a support surface; and adjusting an angular separation between the housing and the support surface by extending the support member from the first position to the second position.

In a third implementation, a mobile communication system includes: a mobile communication device assembly that comprises a housing and a pocket formed in the housing; a mobile communication device mounted in the pocket of the housing; a controller mounted in at least one of the housing or the mobile communication device, the controller comprising at least one hardware processor and at least one memory that stores instructions that, when executed by the at least one hardware processor, cause the controller to perform operations including: identifying feedback data from at least one sensor mounted in the housing or the mobile communication device during or prior to a video communication between the mobile communication device and a remote device; determining, based on the feedback data, a first movement operation of the mobile communication device assembly; and based on the determined first movement operation, operating at least one motor mounted in the housing to move the mobile communication device assembly from a first position to a second position on a support surface.

A mobile communication device assembly according to the present disclosure may include one, some, or all of the following features. For example, an mobile communication device assembly may enable hands-free automatic tracking (e.g., movement) of a participant or subject of a video communication. As another example, the mobile communication device assembly may provide multiple movement operations to track one or more participants of a video communication. As yet another example, the mobile communication device assembly may include tilt or angular position adjustment of a mobile communication device before or during a video communication. Such features may enhance the clarity and participant engagement with the video communication. For example, the mobile communication device assembly may continuously and automatically place the mobile communication device in an optimal location for participant engagement during the video communication. Also, a mobile communication device assembly according to the present disclosure may provide for automatic (e.g., without human intervention) start of or receipt of the video communication.

The details of one or more implementations of the subject matter of this specification are set forth in the accompanying drawings and the description. Other features, aspects, and advantages of the subject matter will become apparent from the description, the drawings, and the claims.

DETAILED DESCRIPTION OF ILLUSTRATIVE EMBODIMENTS

The following detailed description describes systems and methods for enhancing a virtual communication with a mobile communication device and is presented to enable any person skilled in the art to make and use the disclosed subject matter in the context of one or more particular implementations.

Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail inasmuch as such details are within the skill of one of ordinary skill in the art. The present disclosure is not intended to be limited to the described or illustrated implementations, but to be accorded the widest scope consistent with the described principles and features.

The present disclosure describes example implementations of a mobile communication device case or housing that includes a virtual communication assistance system. In the present disclosure, a mobile communication device may include, e.g., a cellphone, or smartphone, or tablet. Other types of mobile communication devices are also contemplated by the present disclosure. In some aspects, the virtual communication assistance system is embodied in a case or cover into which the mobile communication device is received. Alternatively, the virtual communication assistance system may be an outer housing of the mobile communication device. Generally, virtual communications include voice calls, video calls, or other two- (or more) way communication between two or more users. Generally, the present disclosure uses the terms virtual communication assistance system and mobile communication device assembly interchangeably to refer to the combination of the mobile communication device and case or the mobile communication device itself. In some aspects, a user of the mobile communication device assembly may select whether or not to engage the virtual communication assistance system within the assembly to provide for the functionality and features described in the present disclosure.

Figure 1A:
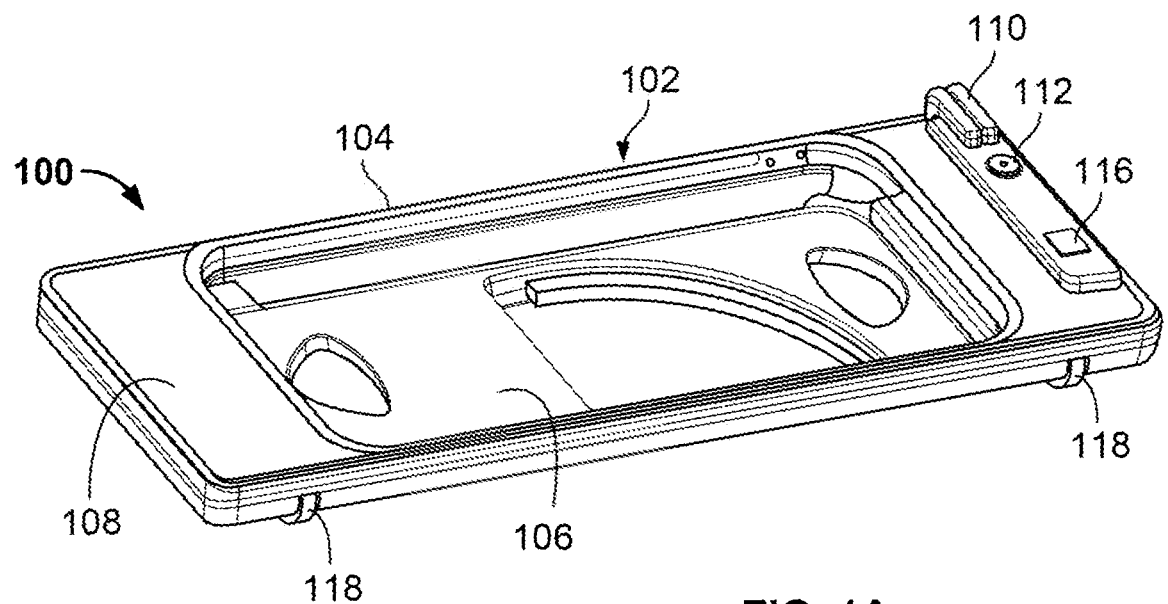
FIGS. 1A-1B depict views of front and back sides, respectively, of an example implementation of a mobile communication device assembly according to the present disclosure.
Figure 1B:
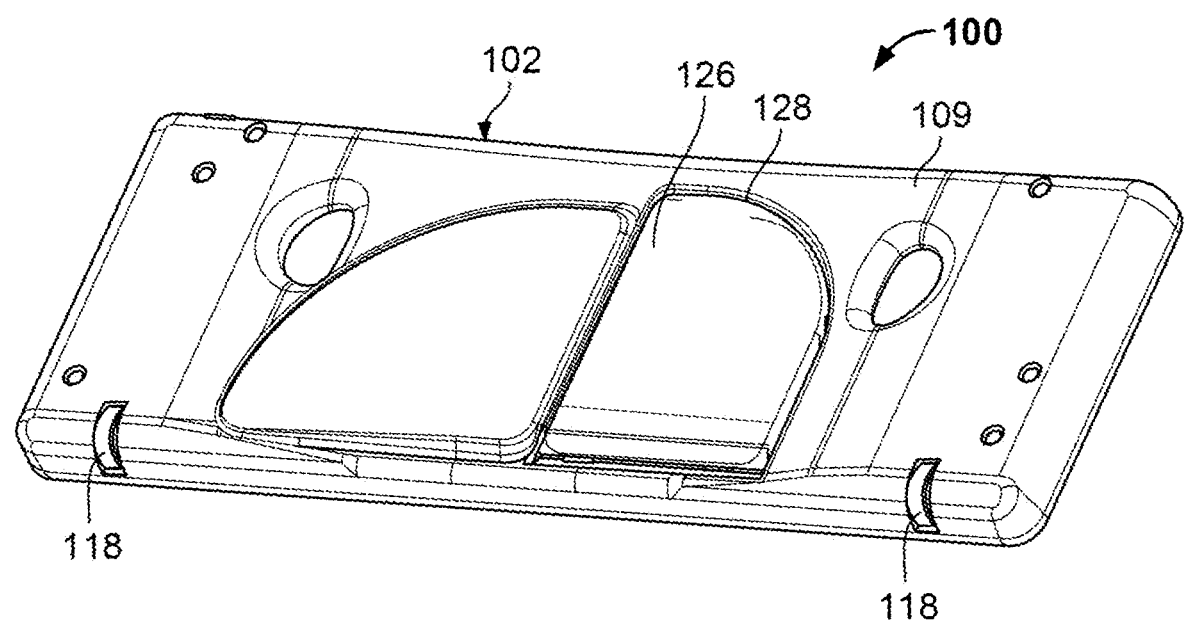

FIGS. 1A-1B depict view of front and back sides, respectively, of an example implementation of a mobile communication device assembly 100. As shown in these figures, the mobile communication device assembly 100 includes a housing 102 that includes, on a front side 108, an opening 104 sized and positioned to receive a mobile communication device (e.g., smartphone, cellphone, tablet) into a pocket 106. Thus, in this illustrated example, the mobile communication device assembly 100 is separate from a mobile communication device that is received within the pocket of the assembly, and connects (e.g., electrically and communicatively) to, the assembly 100. In alternative example implementations, the mobile communication device assembly 100 may be part of a mobile communication device, such that the housing 102 forms all or part of a housing or case of the mobile communication device, itself. In such example implementations, a display screen of the mobile communication device may be located at the pocket 106 of the opening 104. In some aspects, the housing 102 is formed of a non-conductive material so as, for instance, not to create interference with an operation of an antenna of the mobile communication device.

As further shown in FIG. 1A, the front side 108 of the mobile communication device assembly 100 include a transceiver 110, a power button 112, and (optionally) a power indicator 116. The transceiver 11o may provide for two-way wireless communication between the mobile communication device assembly 100 and, for example, other wireless devices to facilitate one or more operations with the mobile communication device assembly 100 as described herein.

The power button 112 may be operated by a user to turn on and turn off the mobile communication device assembly 100. In such instances where the mobile communication device assembly 100 is in an off mode, any mobile communication device that is part of the assembly 100 may function in a conventional manner, i.e., without any operation of the mobile communication device assembly 100. When in an on position, the power indicator 116—which may be in the form of an LED or other suitable illumination device—may be illuminated or may otherwise indicate that the mobile communication device assembly 100 is in the on mode.

Turning to FIG. 1B, a back side 109 of the mobile communication device assembly 100 is shown. In this example implementation, a support member 126 is coupled to the housing 102. In this figure, the support member 126 is shown in a retracted position, flush against the housing 102 and nestled into a recess 128 sized to receive the support member 126. Generally, the support member 126 may be part of an angular adjustment assembly (described later) that operates to lift and tilt the mobile communication device assembly 100 from a substantially flat or horizontal position on a support surface (e.g., a table) to a tiled or angled position in which the support member 126 and only a portion of the back side 109 of the mobile communication device assembly 100 is in contact with the support surface.

As shown in FIGS. 1A-1B, wheels 118 (two shown in these figures, with more than two contemplated by the present disclosure) are positioned to extend from the housing 102 to, for instance, contact the support surface on which the mobile communication device assembly 100 sits. As described herein, the wheels 118 enable or help enable movement of the mobile communication device assembly 100, e.g., on the support surface, during a virtual communication to enhance or adjust a field of view ("FOV") of the mobile communication device. In this example, each wheel 118 is positioned to extend from a lengthwise (i.e., long) edge of the housing 102. In alternative examples, the wheels 118 may both be positioned to extend from a widthwise (i.e., short) edge of the housing 102. In still alternative examples, one or more wheels 118 may be positioned to extend from both the lengthwise and the widthwise edges of the housing 102 (e.g., two wheels 118 extending from one of the two long edges and another two wheels 118 extending from one of the two short edges). In some example implementations, each wheel 118 is a roller (e.g., a spherically shaped roller).

Figure 2A:
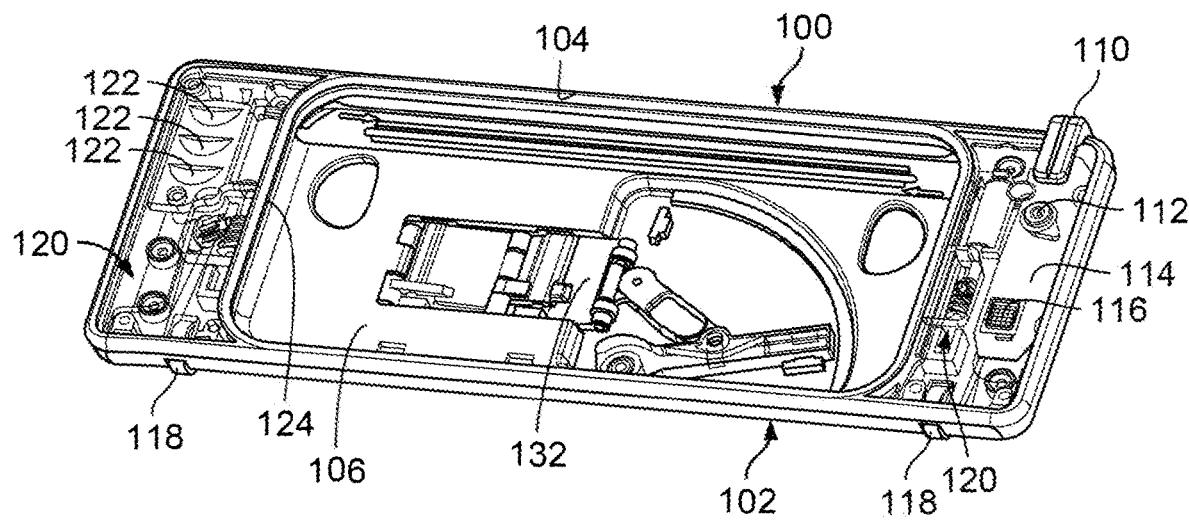
FIGS. 2A-2B depict additional views of the front and back sides, respectively, of the example implementation of a mobile communication device assembly according to the present disclosure.
Figure 2B:
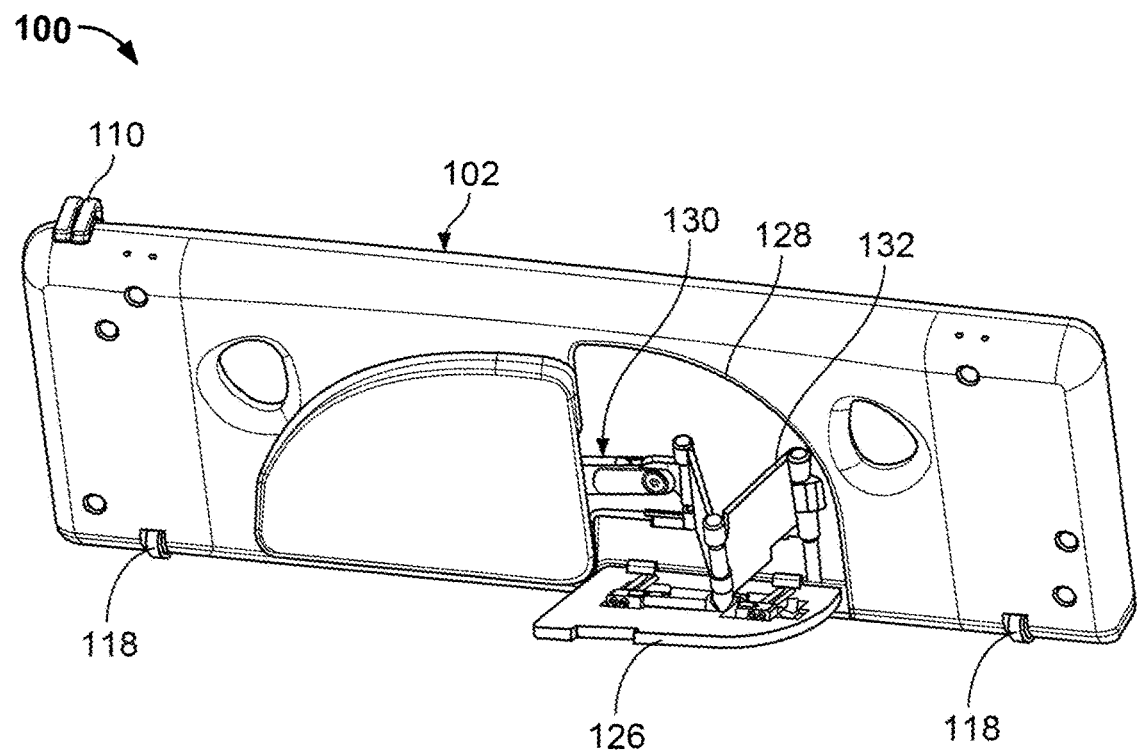

FIGS. 2A-2B depict additional views of the front and back sides, respectively, of the example implementation of the mobile communication device assembly 100. For example, as shown in FIG. 2A, the front view of the mobile communication device assembly 100 includes portions of the housing 102 that have been made transparent for the purposes of showing components of the assembly 100 that are internal (all or a portion) to the housing 102. For example, as shown, a wheel drive assembly 120 (shown in more detail in FIGS. 3A-3C) is mounted in the housing 102 adjacent each of the wheels 118 and is driveably coupled to each of the wheels 118. In this example, there is a one-to-one ratio of wheel drive assemblies 120 to wheels 118, such that each wheel 118 is individually driveable. In alternative examples, a single wheel drive assembly 120 is driveably coupled to more than one wheel 118, such that the single wheel drive assembly 120 can drive two or more wheels 118.

As further shown in FIG. 2A, one or more power sources 122 are mounted in the housing 102. In this example, the power sources 122 are coin batteries. Alternative implementations may include other types of batteries as the power sources 122, such as lithium-ion batteries or otherwise. In example implementations, the power sources 122 may provide electrical power (e.g., at least 4.5 V) to operate the mobile communication device assembly 100 (to operate the wheel drive assemblies 120, the angular adjustment assembly 130 and other components). In some examples the power sources 122 may be the primary power source for the mobile communication device assembly 100. Alternatively, the power sources 122 may be a form of secondary power source for the mobile communication device assembly 100, with the mobile communication device providing the primary source of electrical power to the mobile communication device assembly 100 through a power-data connection 124. In further alternative implementations, such as when primary power to the mobile communication device assembly 100 is provided through the power-data connection 124, power sources 122 may be eliminated (or reduced in number) from the assembly 122 (e.g., to save space in the housing 102).

The power-data connection 124 may, for instance, electrically and communicably couple the mobile communication device assembly 100 and the mobile communication device when the mobile communication device is mounted in the mobile communication device assembly 100. Electrical power from the mobile communication device may be drawn by the mobile communication device assembly 100 while data between the mobile communication device and mobile communication device assembly 100 may be bi-directionally transferred. In some examples, the power-data connection 124 is a USB connection.

In some aspects, the power-data connection 124 is absent from the mobile communication device assembly 100. For example, in some aspects, a form factor of a mobile communication device positioned in the assembly 100 may not allow the connection 124. In such aspects, for instance, communication between the mobile communication device and, e.g., a controller 114, may be wireless, such as Bluetooth, Wi-Fi, or other format.

As shown in FIG. 2A, a controller 114 (e.g., a PCB controller) is mounted in the housing 102 of the mobile communication device assembly 100 and connects to the power-data connection 124. In some aspects, as described herein, the controller 114 may facilitate one or more operations of the mobile communication device assembly 100, either alone or in combination with the mobile communication device. Thus, the controller 114 is communicably coupled to the wheel drive assemblies 120 and angular adjustment assembly 130 (e.g., motors in such assemblies) to command and operate these assemblies 120 and 130 for operation of the mobile communication device assembly 100.

Continuing with FIG. 2A, the angular adjustment assembly 130 is shown as being mounted within a recessed portion of an inner surface of the housing 102 (e.g., under the mobile communication device that is positioned in the pocket 106. In this example, and as more fully described with reference to, e.g., FIG. 4, the angular adjustment assembly 130 includes a hinge 132 that is coupled to the support member 126 (not shown in this figure). FIG. 2A shows the angular adjustment assembly 130 in a retracted position, such that the support member 126 is flush against the housing 102 and nestled into recess 128 (as shown in FIG. 1B).

Turning to FIG. 2B, this figure shows a back view of the mobile communication device assembly 100 with the angular adjustment assembly 130 in an extended position. In the extended position, the support member 126 is extended from the housing 102 to contact, e.g., the support surface on which the mobile communication device assembly 100 sits. In such a position, the support member 126 and angular adjustment assembly 130 operate to tilt the mobile communication device assembly 100 up and away from the support surface (as shown in FIG. 2B).

Figure 3A:
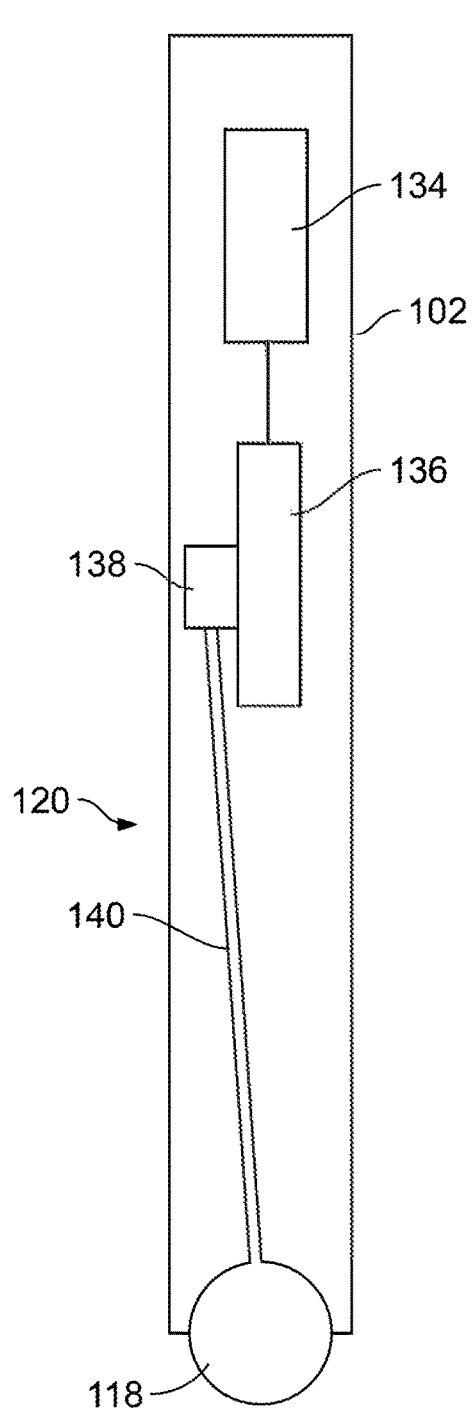
FIGS. 3A-3C depict portions of a wheel drive assembly of an example implementation of a mobile communication device assembly according to the present disclosure.
Figure 3B:
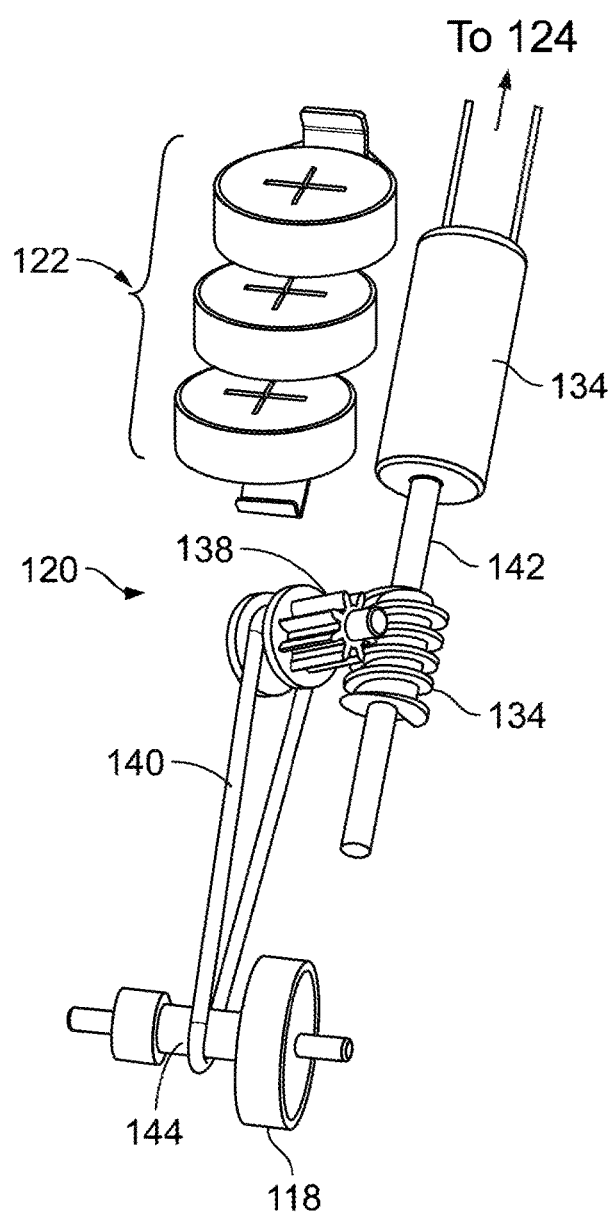
Figure 3C:
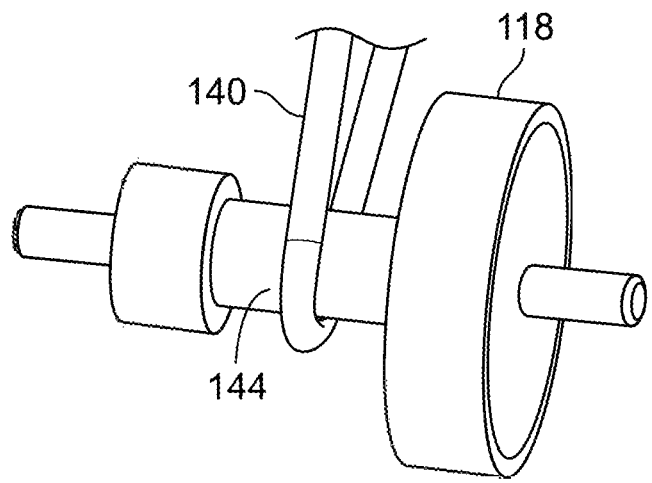

FIGS. 3A-3C depict portions of the wheel drive assembly 120 of the example implementation of the mobile communication device assembly 100. FIG. 3A depicts a schematic side view of the wheel drive assembly 120 mounted in the housing 102. FIG. 3B shows a more detailed view of the example implementation of the wheel drive assembly 120 coupled to the wheel 118. FIG. 3C shows a more detailed view of the wheel 118 and portions of the wheel drive assembly 120.

As shown in FIGS. 3A-3B, this example implementation of the wheel drive assembly 120 includes a motor 134 that is coupled to one or both of the power sources 122 or controller 114 (shown in other figures) to receive electrical power and data (e.g., commands to turn on or off). The motor 134 is coupled to a worm gear 136 (e.g., directly through a shaft 142), which in turn is engaged with a spur gear 138. In some aspects, the spur gear 138 is tilted relative to and in engagement with the worm gear 136 to, e.g., reduce the spin speed and change an axil rotation direction.

A transfer member 140 is coupled to the spur gear 138 and also the wheel 118 to transfer rotational motion of the spur gear 138 (as driven by the motor 134 through the worm gear 136) to the wheel 118. As shown in more detail in FIG. 3B, the transfer member 140 may be comprised of a rigid or semi-rigid band that wraps around respective shafts of the spur gear 138 and wheel 118 (with shaft 144 extending from the wheel 118, as shown in FIG. 3C). In some aspects, use of the band allows for transfer of the rotational drive from the spur gear 138 while minimizing space usage around the wheel 118.

In some aspects, the wheel 118 may be relatively narrow and small in diameter to minimize the opening on the housing 102 through which it protrudes, as well as to minimize cosmetic impact. Increased friction material (e.g., silicon rubber) may be used for a portion of the wheel 119 to prevent slippage when in contact with the support surface. In some aspects, micro bumps may be added to the wheel 118 to increase a friction coefficient.

Although FIGS. 3A-3C illustrate a particular example implementation of the wheel drive assembly 120, other implementations are contemplated by the present disclosure. For example, although a rigid or semi-rigid (or flexible) band may be used for the transfer member 140, a timing belt/bevel gear shaft combination may be used in place of such a band/shaft combination. In some instances, the timing belt/bevel gear shaft combination may have a reduced friction and minimize unmatched turn number issues as compared to the band/shaft combination.

As another example, although a direct drive worm/spur gear combination may be used for the example implementation of assembly 120, a micro bevel gear/geared motor combination may be used in place of such a direct drive worm/spur gear combination. Thus, like the direct drive worm/spur gear combination, the micro bevel gear/geared motor combination may generate linear rotational movement and convert the linear rotational movement to an orthogonal rotation to drive a wheel.

Figure 4:
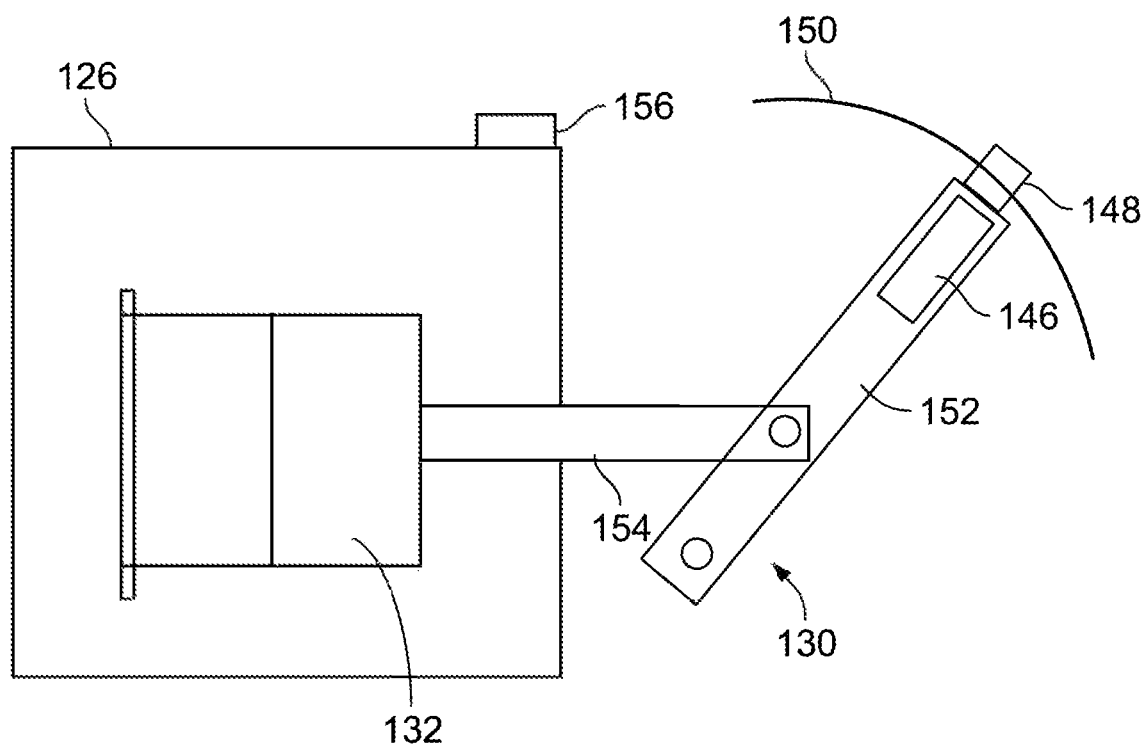
FIG. 4 depicts at least a portion of an angular adjustment assembly and support member of an example implementation of a mobile communication device assembly according to the present disclosure.

FIG. 4 depicts a schematic view of at least a portion of the angular adjustment assembly 130 and support member 126 of the example implementation of the mobile communication device assembly 100. As shown in this figure, the angular adjustment assembly 130 includes a motor 146 that is coupled to one or both of the power sources 122 (shown in other figures) or controller 114 (shown in other figures) to receive electrical power and data (e.g., commands to turn on or off). The motor 146, in this example, is mounted in a pivot arm 152 that is coupled to a push rod 154 at a pivot point. The push rod 154, in turn, is coupled to the hinge 132, which is coupled to the support member 126. In this example, a rack gear 148 is directly coupled to the motor 146 and engaged with an arc-shaped pinion gear 150. As illustrated in other figures (e.g., FIGS. 5A-5E), the pinion gear 150 may be formed on an internal surface of the housing 132. As shown in this example, the pivot arm 152 and push rod 154 work in combination such that, when the motor 146 drives the rack gear 148 through the arc of the pinion gear 150 (e.g., from a bottom, right end of the arc to a top, left end of the arc), the force and torque generated by such movement is transferred to the pivot arm 152, to the push rod 154, and into the hinge 132. Movement of the hinge 132 (e.g., pivoting from a flat position to a folded position) transfers the force to drive the support member 126 from the retracted position to the extended position.

In this example, the support member 126 includes a contact point 156 positioned at a corner of the support member 126. In some aspects, the contact point 156 may be simply a portion of the support member 126 that protrudes from the generally-square shaped member 126. In some aspects, the contact point 156 may be comprised of a relatively lower friction material and positioned such that, when the support member is in the extended position (shown in FIG. 2B), the contact point 156 is about halfway between the two wheels 118.

Although FIG. 4 illustrates a particular example implementation of the angular adjustment assembly 130, other implementations are contemplated by the present disclosure. For example, although a hinge (e.g., a folding structure) may be used in the assembly 130, a linear motor that is coupled to a push rod and rides on a screw rail may be used in place of the hinge to urge the support member 126 from the retracted to the extended position. Thus, the linear motor can couple with the push rod 154 to push the rod 154 and ride on a screw rail to fold (or unfold) the hinge 132.

Figure 5A:
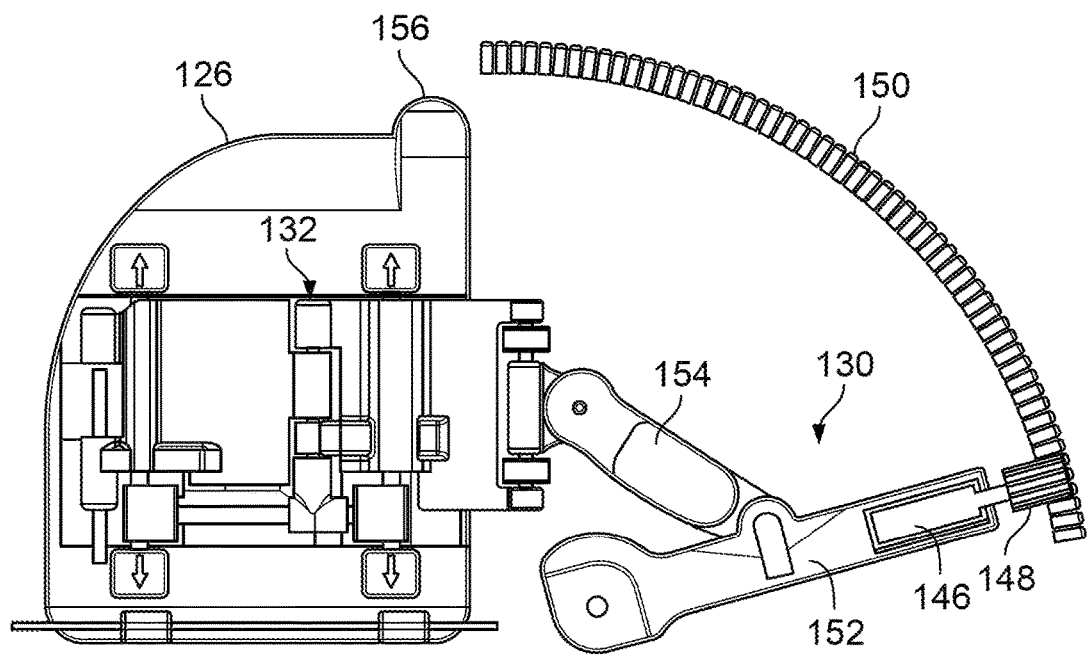
FIGS. 5A-5E depict views of at least a portion of the angular adjustment assembly and support member in a retracted position according to the present disclosure.
Figure 5B:
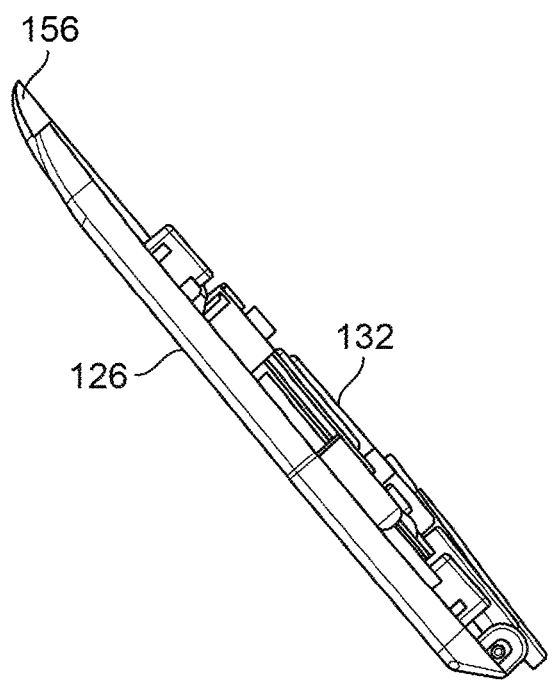
Figure 5C:
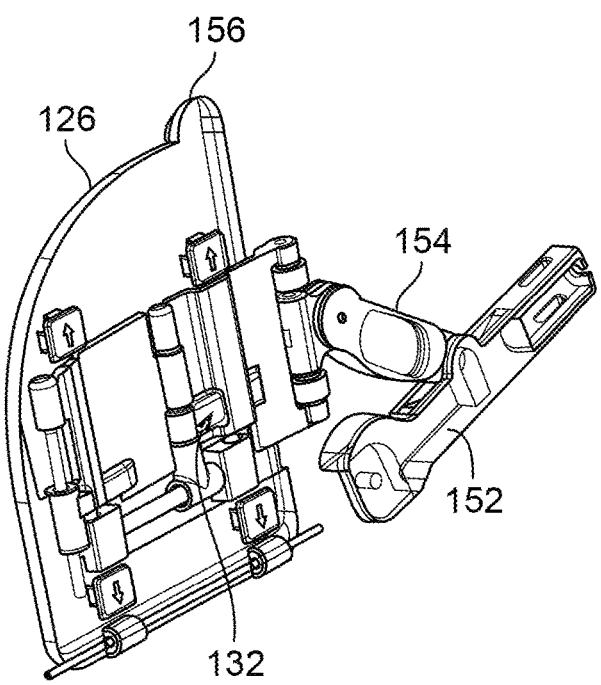
Figure 5D:
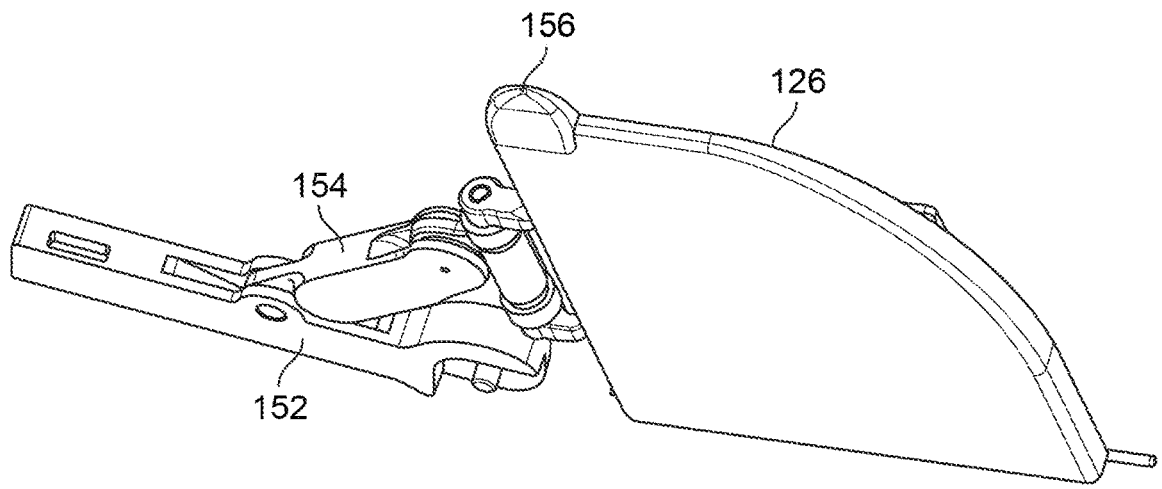
Figure 5E:
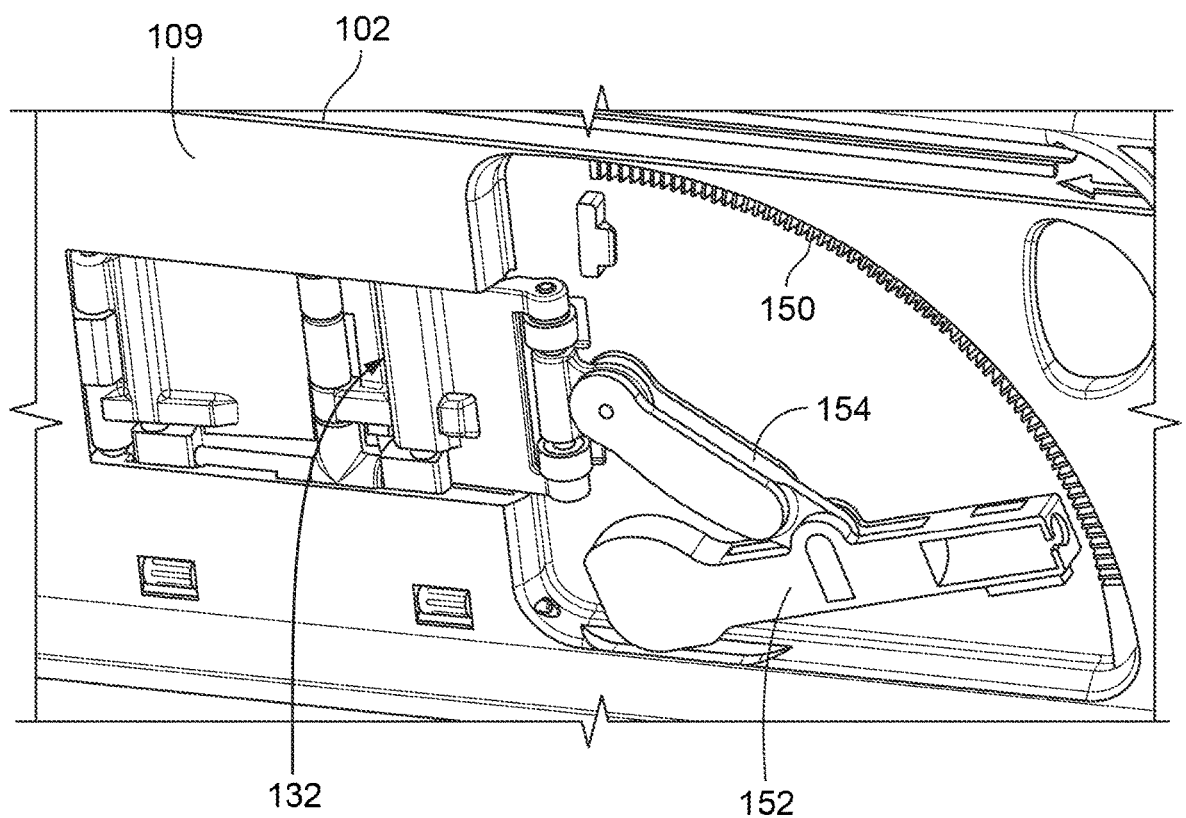

FIGS. 5A-5E depict views of at least a portion of the angular adjustment assembly 130 and support member 126 in the retracted position. For example, FIG. 5A shows a top view, as if looking down on the angular adjustment assembly 130 and support member 126 in the absence of the rest of the mobile communication device assembly 100. FIG. 5B shows a side view. FIGS. 5C-5D show different isometric views. FIG. 5E shows a third isometric view including a portion of the housing 102. As shown in FIGS. 5A and 5E, in the retracted position with the support member 126 flush against the housing 102, the pinion gear 148 is at a bottom, right end of the arc of the rack gear 150. In this position, the pivot arm 152 and push rod 154 are connected at an obtuse angle at the pivot point, and the hinge 132 is in a flat, or unfolded, position. Thus, the hinge 132 and support member 126 are substantially positioned in parallel planar positions when the support member 126 is retracted.

Figure 6A:
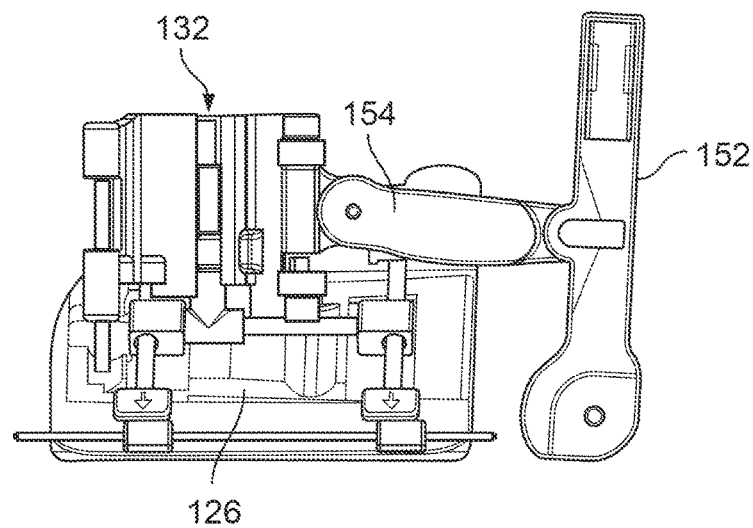
FIGS. 6A-6E depict views of at least a portion of the angular adjustment assembly and support member in an extended position according to the present disclosure.
Figure 6B:
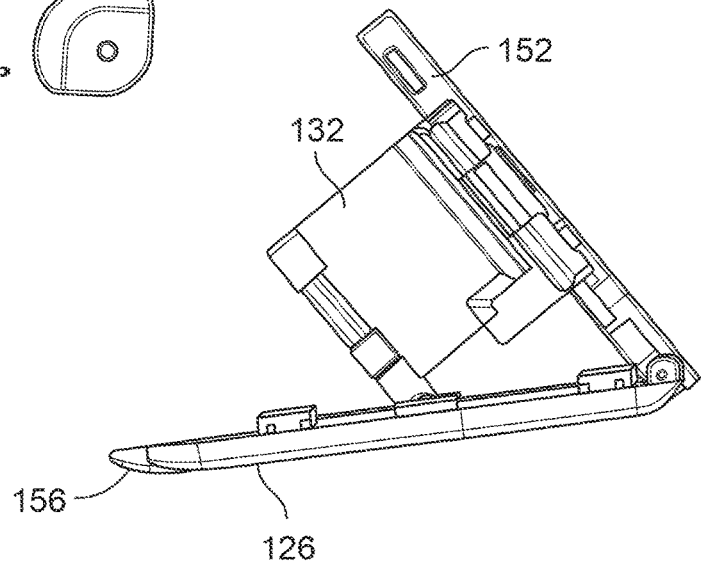
Figure 6C:
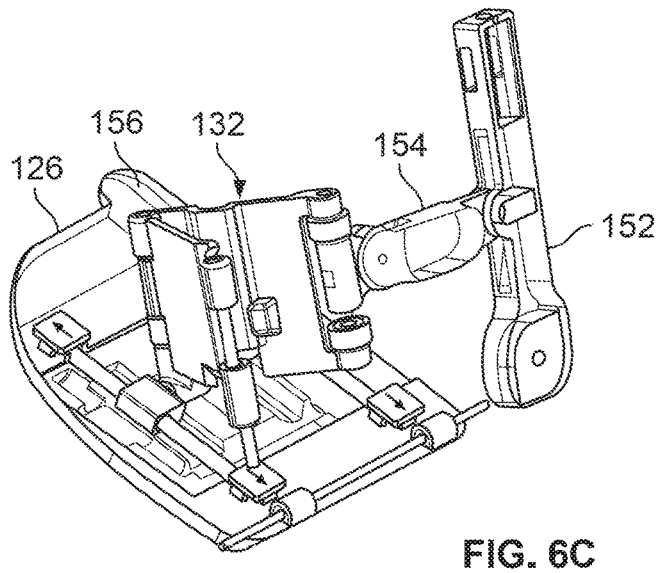
Figure 6D:
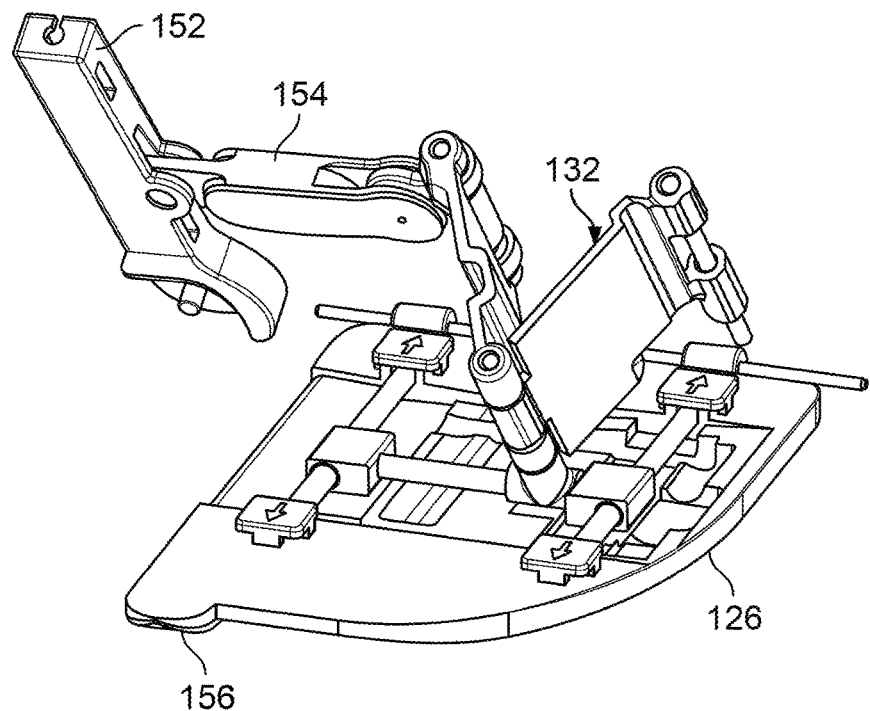
Figure 6E:
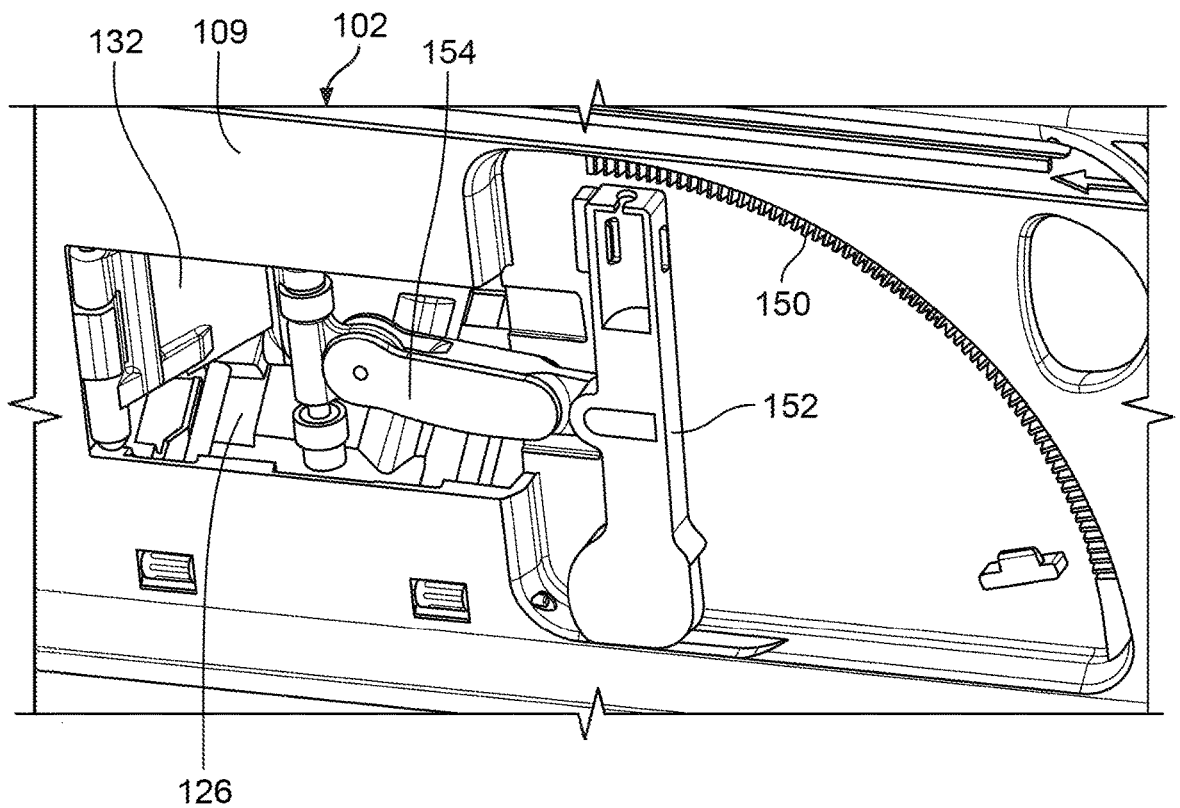

FIGS. 6A-6E depict views of at least a portion of the angular adjustment assembly 130 and support member 126 in the extended position. For example, FIG. 6A shows a top view, as if looking down on the angular adjustment assembly 130 and support member 126 in the absence of the rest of the mobile communication device assembly 100. FIG. 6B shows a side view. FIGS. 6C-6D show different isometric views. FIG. 6E shows a third isometric view including a portion of the housing 102. As shown in FIGS. 6A and 6E, in the extended position with the support member 126 tilted away from a back side 109 of the housing 102, the pinion gear 148 is at a top, left end of the arc of the rack gear 150. In this position, the pivot arm 152 and push rod 154 are connected at right angle at the pivot point, and the hinge 132 is in a folded position.

Figure 7A:
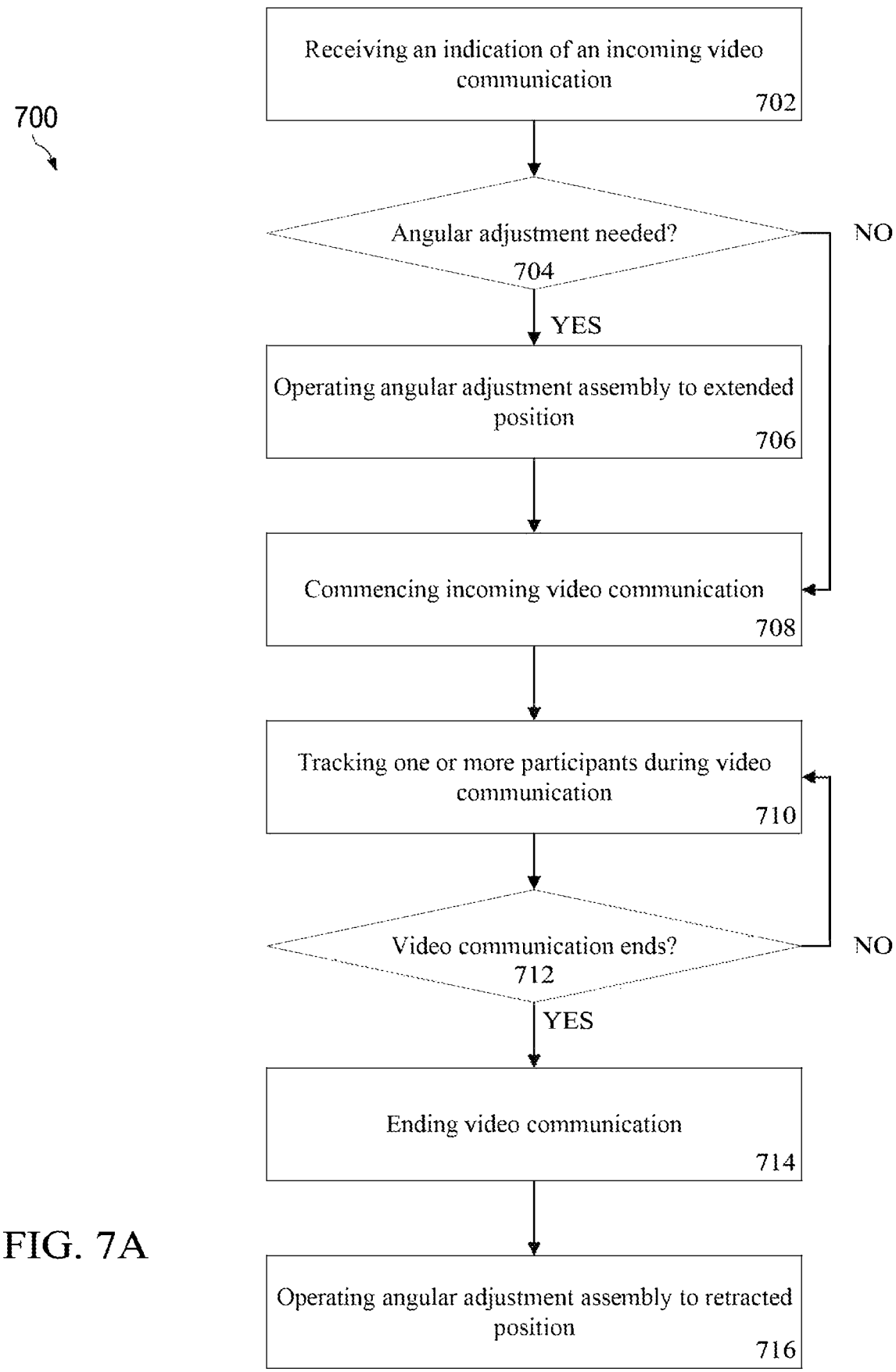
FIGS. 7A-7B depict flowcharts that describe example methods of use of a mobile communication device assembly according to the present disclosure.
Figure 7B:
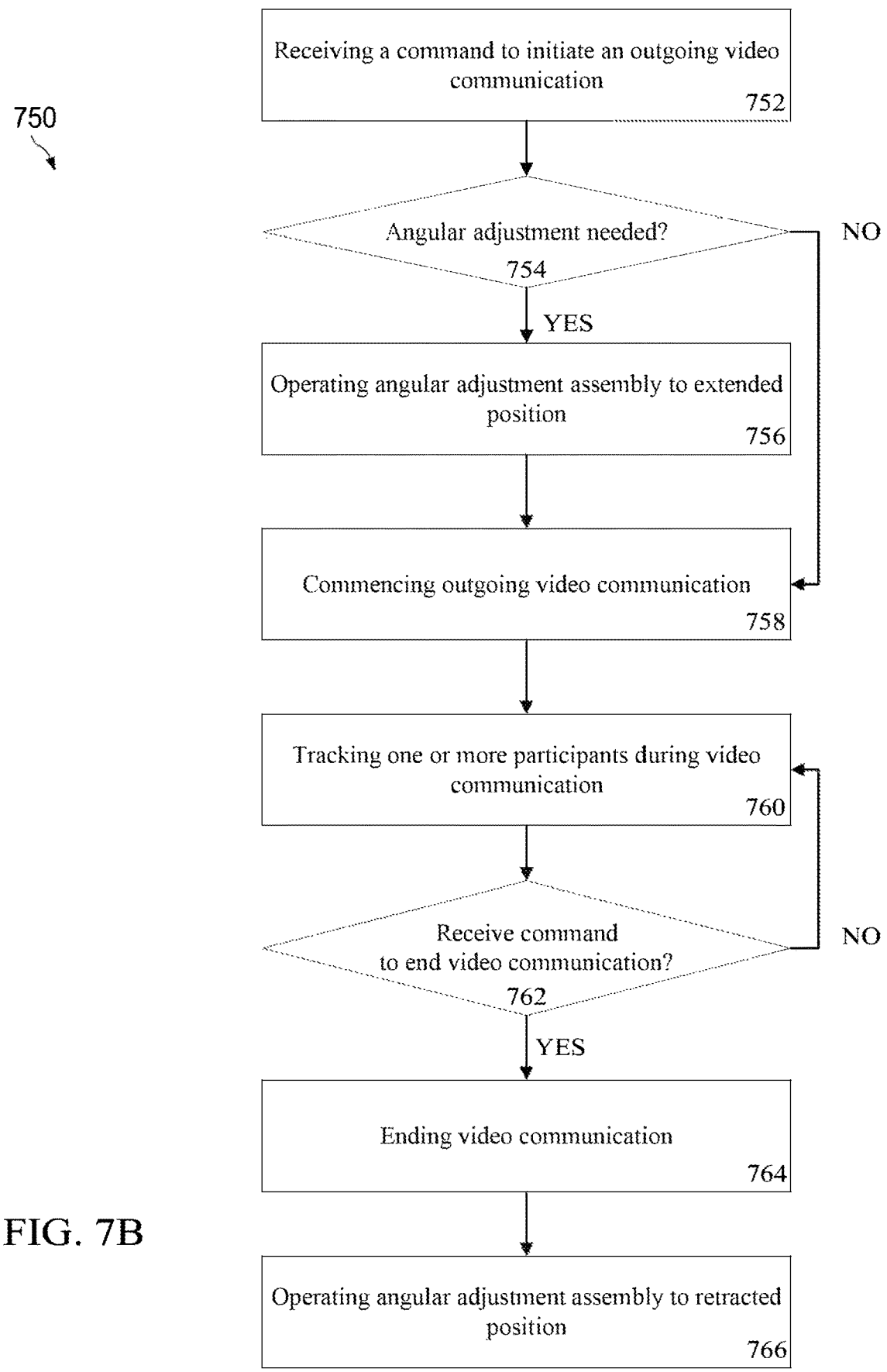

FIGS. 7A-7B depict flowcharts that describe example methods 700 and 750 of use of a mobile communication device assembly, such as the mobile communication device assembly 100 described in the present disclosure. The example methods 700 and 750 are described with reference to the example implementation of the mobile communication device assembly 100 including a mobile communication device (e.g., a smartphone in this example) positioned in and connected to (e.g., data and power) the mobile communication device assembly 100. Turning to FIG. 7A, method 700 may describe an "incoming video communication" mode of the mobile communication device assembly 100. For example, method 700 may describe an example process that occurs when a video communication is received at the smartphone positioned in and connected to the mobile communication device assembly 100.

Method 700 may begin at step 702, which includes receiving an indication of an incoming video communication to the smartphone in the mobile communication device assembly 100. For example, in some aspects, the smartphone may be on and in an active state or on and in an inactive state (e.g., sleep state). Upon receipt of the indication that there is an incoming video communication, the smartphone may alert one or more potential communication participants of the incoming video communication. In some aspects, the mobile communication device assembly 100 may also be on and in an active mode or on and in an inactive mode. If the mobile communication device assembly 100 is in an inactive mode or off during step 702, a user may wake-up or turn the mobile communication device assembly 100 on (e.g., through the power button 112 or through a voice command).

Method 700 may continue at step 704, which includes a decision on whether an angular adjustment of the smartphone is needed. For example, in some cases, prior to or upon receipt of the incoming video communication, the smartphone (and mobile communication device assembly 100) is lying "flat" on a support surface, such as a table. In the "flat" position, a display screen of the smartphone may be oriented vertically upward, so that the field of view ("FOV") of the smartphone is directed upward away from the support surface. In the flat position, the mobile communication device assembly 100 is also oriented such that the front side 108 is directed upward away from the support surface and the back side 109 is in contact with the support surface (i.e., the retracted position).

If the smartphone is in the flat position, the decision of step 704 may be "yes" and lead to step 706, which includes operating an angular adjustment assembly of the mobile communication device assembly 100 to an extended position (e.g., shown in FIG. 2B) from a retracted position (e.g., shown in FIG. 1B). For example, as described with reference to FIG. 4 and FIGS. 6A-6E, the angular adjustment assembly 130 may operate so that the motor 146 (controlled by the controller 114) operates to drive the pinion gear 148 through the are of the rack gear 140, thereby forcibly urging the hinge 132 into a folded position to push the support member 126 away from the housing 102. By pushing the support member 126 away from the housing 102, the mobile communication device assembly 102 (and smartphone) is angularly adjusted from the flat position on the support surface to a raised, or tilted, position, thereby changing the FOV of the smartphone.

In some aspects, step 706 includes the mobile communication device assembly 100 receiving feedback from the smartphone in order to control operation of the angular adjustment assembly 130. For example, the smartphone, through the display screen and image tracking function of the smartphone (e.g., to focus on a user face), may provide data to the mobile communication device assembly 100 that indicates that an angle between the housing 102 and the support surface needs to be adjusted (e.g., increased or decreased). Thus, upon receipt of such data, the mobile communication device assembly 100 may operate the angular adjustment assembly 130 to further adjust the tilt angle of the housing 102 above the support surface. This may occur, for example, by the pinion gear 148 being positioned by the motor 146 at a particular location along the are of the rack gear 150.

If the smartphone is already in a correct tilted position (e.g., based on the smartphone indicating that the FOV is correct as positioned), then the decision of step 704 may be "no" and lead to step 708, which includes commencing incoming video communication. For example, the smartphone may "answer" the incoming video call, thereby facilitating the video communication between one or more remote participants and one or more local participants (e.g., in the same location as the mobile communication device assembly 100).

Method 700 may continue at step 710, which includes tracking one or more local participants during the video communication. For example, in some aspects, the mobile communication device assembly 100 may track one or more local participants by adjusting a FOV of the smartphone during the video communication. This adjustment may occur, in combination with feedback data from the smartphone, for the purpose of ensuring that the FOV of the smartphone is generally focused on a speaker among the local participants. Generally, being focused on the speaker ensures a higher quality of the video communication, and may require that the speaker be a center of focus of the FOV of the smartphone.

Figure 8A:
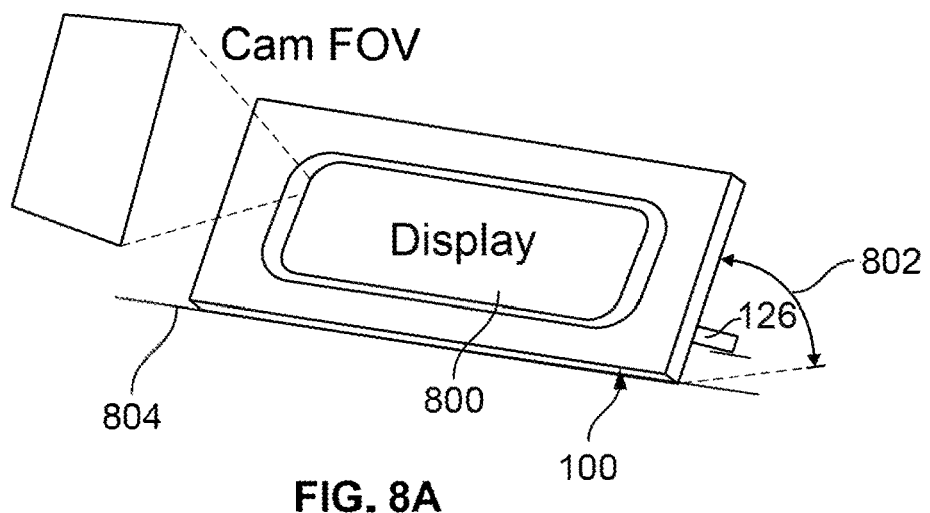
FIGS. 8A-8G depict example movement operations of a mobile communication device assembly according to the present disclosure.

The tracking in step 710 may include one or more movements and operations of the mobile communication device assembly 100. For example, FIGS. 8A-8G depict example tracking, or movement operations, of the mobile communication device assembly 100 during the video communication in step 710. As one example, FIG. 8A shows a tilt, or angular adjustment, operation in which the movement 802 operates to adjust a tilt of the smartphone 800 relative to the support surface 804 on which the mobile communication device assembly 100 sits during the video communication. As shown, the movement 802 can be bi-directional to increase or decrease an angle between the mobile communication device assembly 100 and the support surface 804 (in contact with an edge of the mobile communication device assembly 100 and the support member 126). As shown, the tilt movement 802 adjusts the smartphone FOV.

Figure 8B:
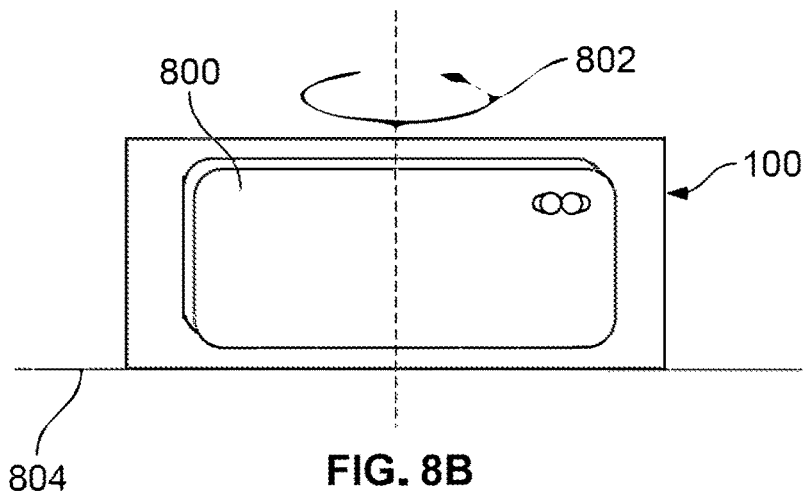

As another example, FIG. 8B shows a rotation operation in which the movement 802 operates to rotate the smartphone 800 relative to a vertical axis (shown by the dotted line) orthogonal to the support surface 804. The rotational movement 802 can be bi-directional (e.g., clockwise or counter clockwise) to change the direction of the FOV of the smartphone (e.g., in order to change focus from one speaker of the video communication to another speaker of the video communication). In some aspects, this rotation operation 802 includes operating one of two wheels 118 (e.g., by the wheel drive assembly 120) to rotate the mobile communication device assembly 100.

Figure 8C:
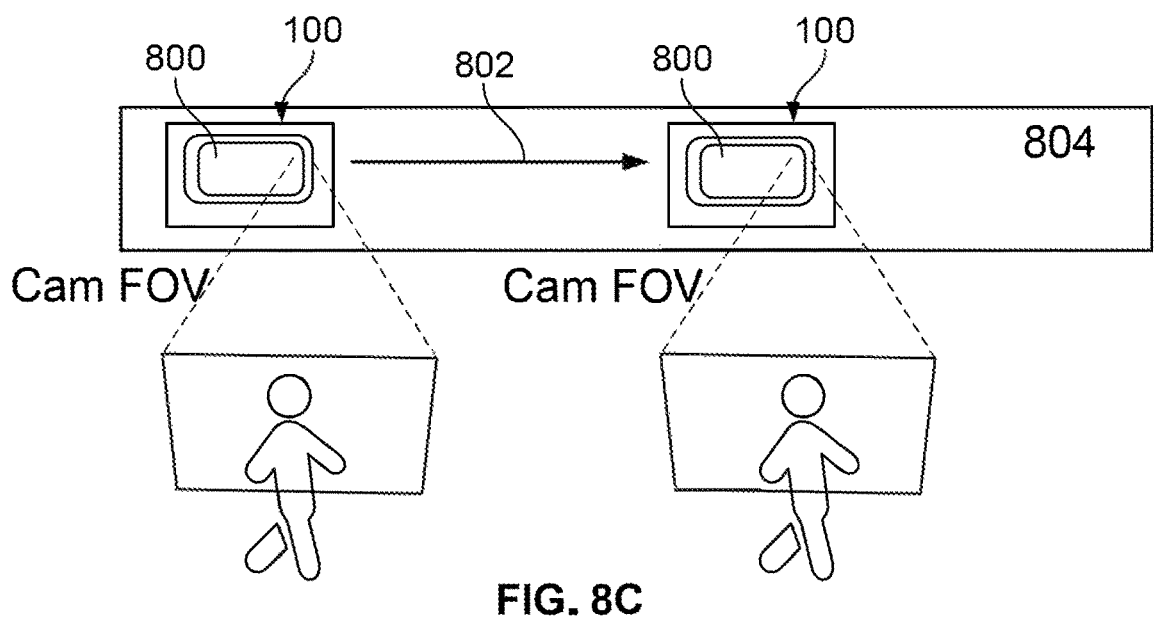

As another example, FIG. 8C shows a linear tracking operation (e.g., in an X or Y direction along the support surface 804, in which both X and Y axes lie in the same plane as the support surface 804) in which the movement 802 operates to move the smartphone 800 in a linear (bi-directional) path along the support surface 804. The linear movement 802 can be bi-directional to change the FOV of the smartphone (e.g., in order to follow a speaker of the video communication from one location to another location, or to move from one speaker to another speaker). In some aspects, this linear movement operation 802 includes operating one or both wheels 118 (e.g., by the wheel drive assemblies 120) to move the mobile communication device assembly 100. In some aspects, the wheels 118 may be first rotated toward a path of movement prior to the wheel drive assemblies 120 driving rotation of the wheels 118.

Linear movement 802 may be accomplished in a number of ways. As one example, in aspects where an axis of rotation of the wheels 118 is generally fixed parallel to the lengthwise edge of the housing 102 (as shown, e.g., in FIG. 1B), each wheel 118 may be operated with different rotation directions (e.g., one clockwise and the other counterclockwise) and at different rotation speeds. By manipulating the control of the wheels 118 (by the controller 114 through the wheel drive assemblies 120), the mobile communication device assembly 100 may move in a zig-zag but substantially linear direction. As another example, each wheel 118 may be rotatable to adjust the axis of rotation of the particular wheel 118 and thus the directional movement of the wheel 118. In such aspects, the wheels 118 may be turned such that the axis of rotation is perpendicular to the lengthwise edge of the housing 102 so that the mobile communication device assembly 100 travels in a linear direction parallel to the lengthwise edge of the housing 102.

Figure 8D:
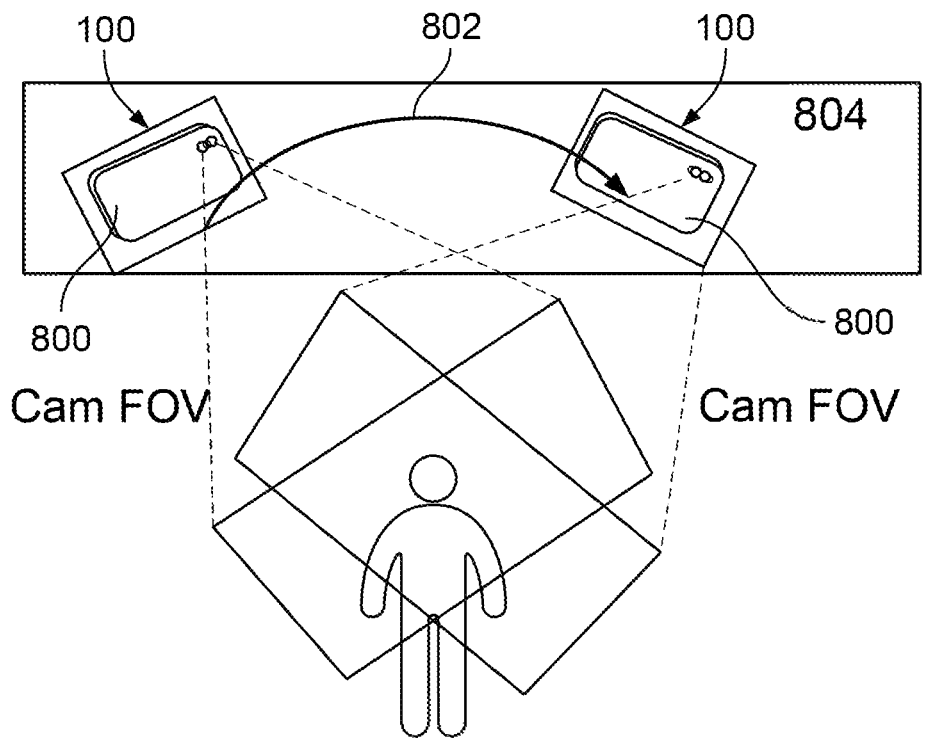

As another example, FIG. 8D shows an are tracking operation in which the movement 802 operates to move the smartphone 800 in a curvilinear path (e.g., relative to the edges of the support surface 804) along the support surface 804. The are movement 802 is in both X and Y directions to change the FOV of the smartphone (e.g., in order to move from one speaker of the video communication to another speaker, or to change the FOV angle on a particular speaker). In some aspects, this are movement operation 802 includes operating one or both wheels 118 (e.g., by the wheel drive assemblies 120) to move the mobile communication device assembly 100. In some aspects, the wheels 118 may be first rotated toward a path of diagonal movement prior to the wheel drive assemblies 120 driving rotation of the wheels 118.

Figure 8E:
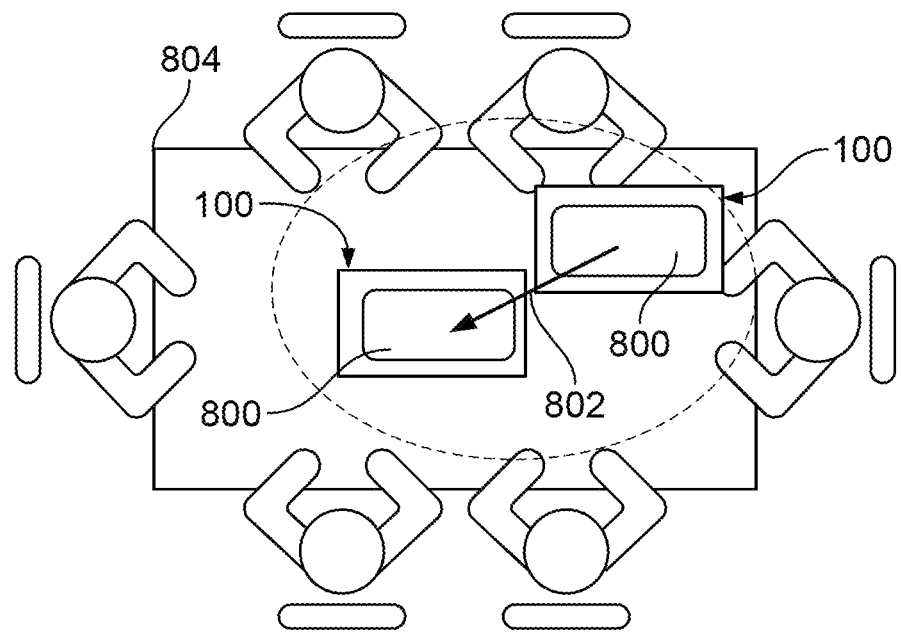

As another example, FIG. 8E shows a diagonal tracking operation (e.g., in both X and Y directions along the support surface 804) in which the movement 802 operates to move the smartphone 800 in a diagonal path (e.g., relative to the edges of the support surface 804) along the support surface 804. The diagonal movement 802 is in both X and Y directions to change the FOV of the smartphone (e.g., in order to move from one speaker of the video communication to another speaker). In some aspects, this diagonal movement operation 802 includes operating one or both wheels 118 (e.g., by the wheel drive assemblies 120) to move the mobile communication device assembly 100. In some aspects, the wheels 118 may be first rotated toward a path of diagonal movement prior to the wheel drive assemblies 120 driving rotation of the wheels 118.

Figure 8F:
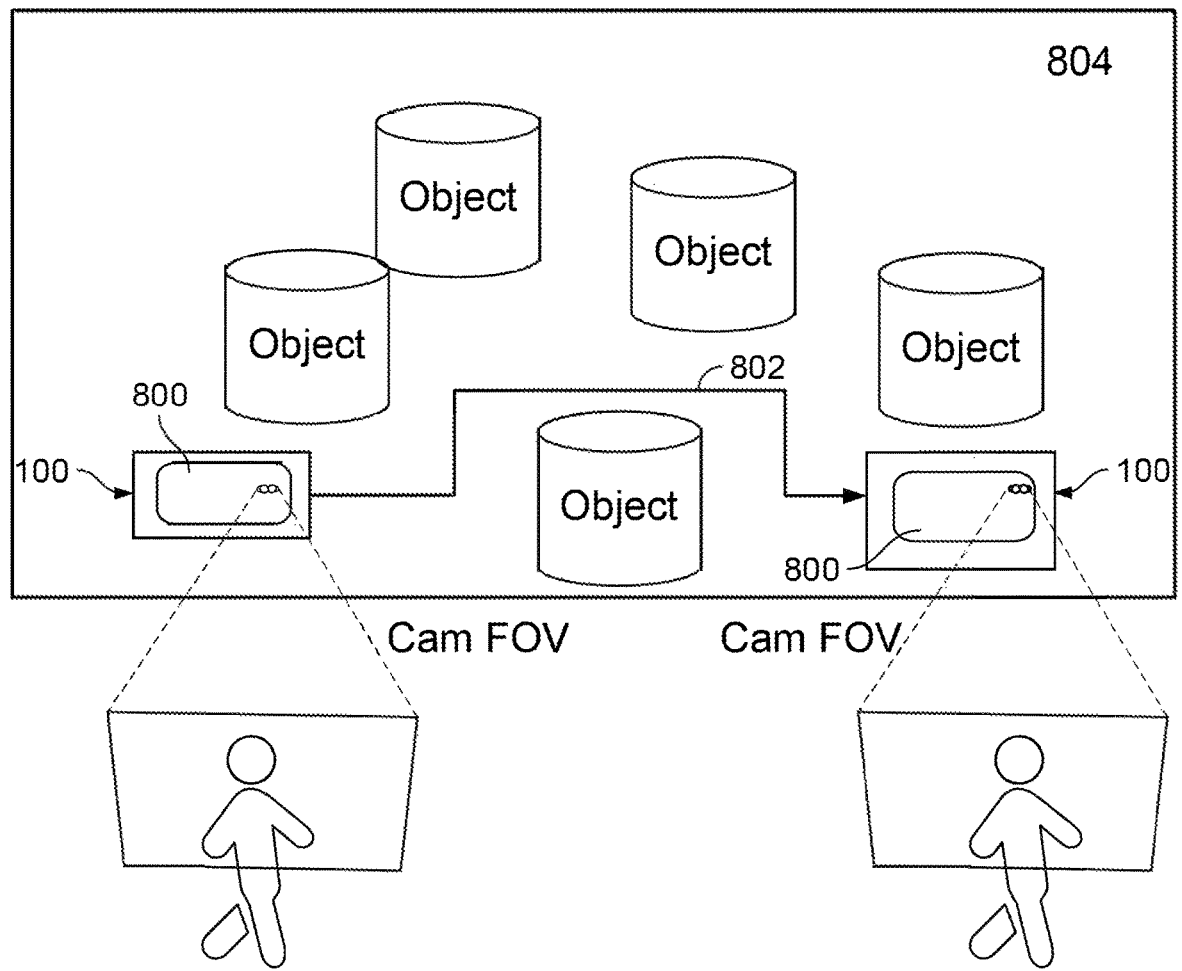

As another example, FIG. 8F shows a multi-direction obstacle avoidance tracking operation in which the movement 802 operates to move the smartphone 800 in a non-linear path along the support surface 804 while simultaneously avoiding collision or contact with one or more obstacles (objects) on the support surface 804. The non-linear movement 802 is in both X and Y directions to change the FOV of the smartphone (e.g., in order to move from one speaker of the video communication to another speaker, or to change the FOV angle on a particular speaker, or to follow a particular speaker). In some aspects, the non-linear movement 802 in this operation includes feedback from one or more sensors on the smartphone that provide for image recognition. For example, the image recognition functionality of the smartphone (or other sensors that detect objects in a path, such as radar or otherwise) may provide feedback to the mobile communication device assembly 100. This feedback is used by the controller 114 in order to control one or both of the wheel drive assembly 120 or angular adjustment assembly 130 to control movement of the mobile communication device assembly 100. Alternatively, such functionality (and sensors, such as IR sensor 11o) in the controller 114 may provide the obstacle data to control operation of one or both of the wheel drive assembly 120 or angular adjustment assembly 130. In this example, the non-linear obstacle avoidance movement 802 changes the location of the mobile communication device assembly 100 and smartphone from one end of the support surface 804 to another end of the support surface 804.

Figure 8G:
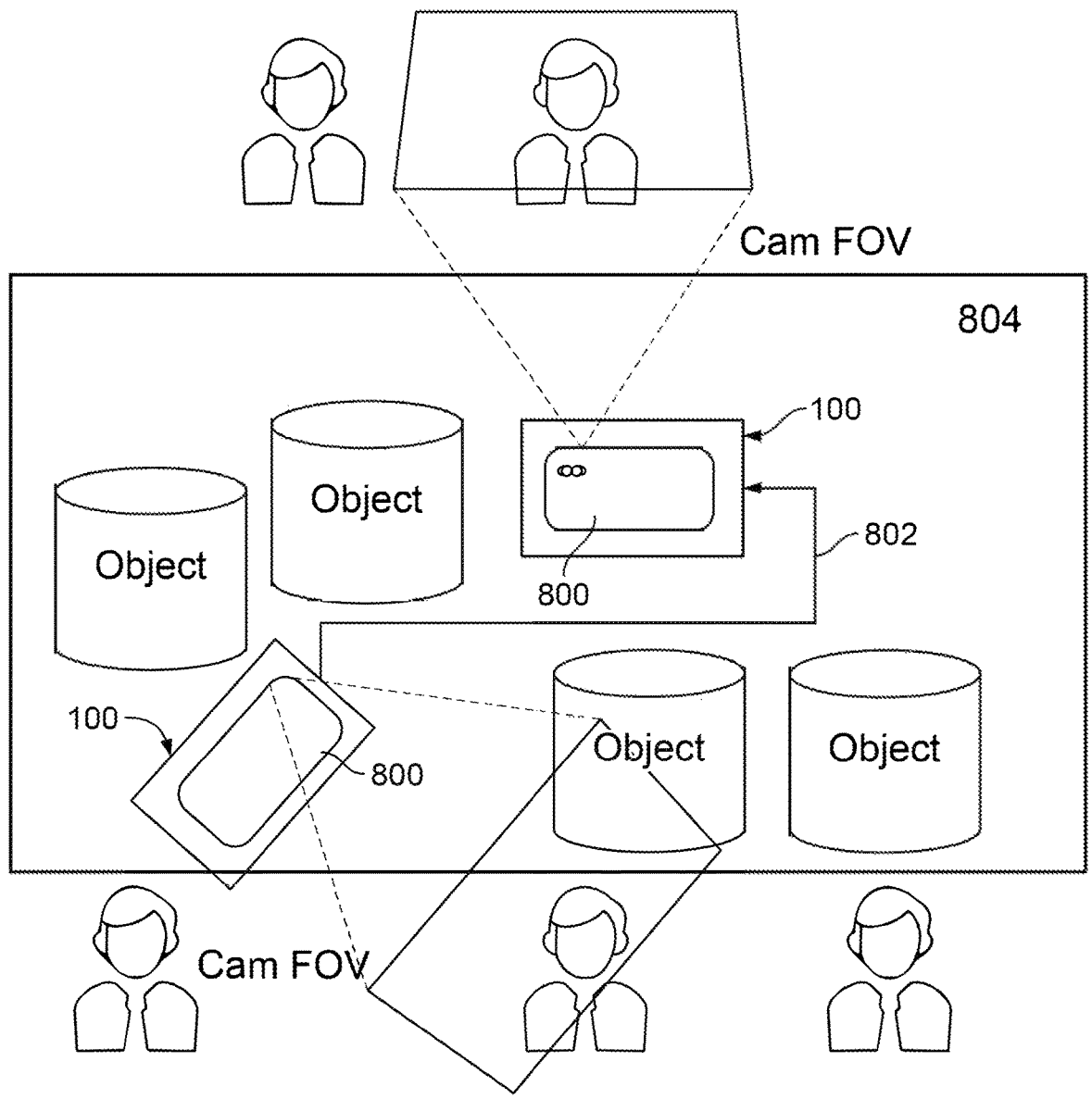

As another example, FIG. 8G shows another multi-direction obstacle avoidance tracking operation in which the movement 802 operates to move the smartphone 800 in a non-linear path along the support surface 804 while simultaneously avoiding collision or contact with one or more obstacles (objects) on the support surface 804. The non-linear movement 802 is in both X and Y directions to change the FOV of the smartphone (e.g., in order to move from one speaker of the video communication to another speaker, or to change the FOV angle on a particular speaker, or to follow a particular speaker). In some aspects, the non-linear movement 802 in this operation includes feedback from one or more sensors on the smartphone that provide for image recognition. For example, the image recognition functionality of the smartphone (or other sensors that detect objects in a path, such as radar or otherwise) may provide feedback to the mobile communication device assembly 100. This feedback is used by the controller 114 in order to control one or both of the wheel drive assembly 120 or angular adjustment assembly 130 to control movement of the mobile communication device assembly 100. Alternatively, such functionality (and sensors, such as IR sensor 11o) in the controller 114 may provide the obstacle data to control operation of one or both of the wheel drive assembly 120 or angular adjustment assembly 130. In this example, the non-linear obstacle avoidance movement 802 changes the location of the mobile communication device assembly 100 and smartphone from one side of the support surface 804 to another side of the support surface 804.

In some aspects, the tracking operation of step 710 is automatic and occurs without user command (e.g., audio command or otherwise). For example, feedback from the smartphone or data determined by the controller 114, such as image recognition feedback, audio feedback, digital focus of FOV feedback, facial recognition feedback, and other feedback, may provide the input data to the controller 114 that is then used to determine output commands from the controller 114 to one or more of the wheel drive assembly 120 or angular adjustment assembly 130. Alternatively, or additionally, the tracking operation of step 710 may use audio commands from a local user (or remote user) of the mobile communication device assembly 100 to perform a particular movement operation. As an example, a local user may speak the command "rotate the smartphone 180 degrees" to initiate a rotational movement shown in FIG. 8B.

Method 700 may continue at step 712, which includes a determination of whether the video communication has ended. If the determination is "no" then method 700 may continue back to step 710 as previously described. If the determination is "yes" then method 700 may continue at step 714, which includes ending the video communication.

Method 700 may continue at step 716, which includes operating the angular adjustment assembly 130 to the retracted position. For example, once the video communication on the smartphone ends, the mobile communication device assembly 100 may operate to retract the support member 126 back into the flush position in the recess 128 of the housing 102. By doing so, the mobile communication device assembly 100 (and smartphone) will return to a flat position on the support surface.

Method 700 may also include other steps, either in place of or in addition to the example steps illustrated in FIG. 7A. Such steps may occur prior to step 702, after step 716, or between one or more of the described steps. For example, the mobile communication device assembly 100 may perform one or more diagnostic operations, such as: checking device condition, checking user recognition functionality, checking image analysis functionality, or checking environmental conditions. As another example, the mobile communication device assembly 100 may receive, and perform an operation based on receipt of, a voice command from a user, such as a command to "wake up," "turn on," "turn off," or "end voice call," among others. As another example, additional commands (e.g., by voice of a participant or by visual recognition on the smartphone or assembly) may control the mobile communication device assembly during method 700. These additional commands include, for example, commands to move or adjust a location or tilt of the mobile communication device assembly, commands to instruct the mobile communication device assembly to avoid a particular obstacle on the support surface, or otherwise.

Turning to FIG. 7B, method 750 may describe an "outgoing video communication" mode of the mobile communication device assembly 100. For example, method 750 may describe an example process that occurs when a video communication is initiated at the smartphone positioned in and connected to the mobile communication device assembly 100.

Method 750 may begin at step 752, which includes receiving a command to initiate an outgoing video communication with the smartphone in the mobile communication device assembly 100. For example, in some aspects, the smartphone may be on and in an active state or on and in an inactive state (e.g., sleep state). Upon receipt of the command, the smartphone may call the desired recipient of the video communication. In some aspects, the command is a voice command from a user (e.g., "Call John Doe").

Method 750 may continue at step 754, which includes a decision on whether an angular adjustment of the smartphone is needed. For example, in some cases, prior to or upon receipt of the command, the smartphone (and mobile communication device assembly 100) is lying "flat" on a support surface, such as a table. In the "flat" position, a display screen of the smartphone may be oriented vertically upward, so that the field of view ("FOV") of the smartphone is directed upward away from the support surface. In the flat position, the mobile communication device assembly 100 is also oriented such that the front side 108 is directed upward away from the support surface and the back side 109 is in contact with the support surface (i.e., the retracted position).

If the smartphone is in the flat position, the decision of step 754 may be "yes" and lead to step 756, which includes operating an angular adjustment assembly of the mobile communication device assembly 100 to an extended position (e.g., shown in FIG. 2B) from a retracted position (e.g., shown in FIG. 1B). For example, as described with reference to FIG. 4 and FIGS. 6A-6E, the angular adjustment assembly 130 may operate so that the motor 146 (controlled by the controller 114) operates to drive the pinion gear 148 through the are of the rack gear 140, thereby forcibly urging the hinge 132 into a folded position to push the support member 126 away from the housing 102. By pushing the support member 126 away from the housing 102, the mobile communication device assembly 102 (and smartphone) is angularly adjusted from the flat position on the support surface to a raised, or tilted, position, thereby changing the FOV of the smartphone.

In some aspects, step 756 includes the mobile communication device assembly 100 receiving feedback from the smartphone in order to control operation of the angular adjustment assembly 130. For example, the smartphone, through the display screen and image tracking function of the smartphone (e.g., to focus on a user face), may provide data to the mobile communication device assembly 100 that indicates that an angle between the housing 102 and the support surface needs to be adjusted (e.g., increased or decreased). Thus, upon receipt of such data, the mobile communication device assembly 100 may operate the angular adjustment assembly 130 to further adjust the tilt angle of the housing 102 above the support surface. This may occur, for example, by the pinion gear 148 being positioned by the motor 146 at a particular location along the are of the rack gear 150.

If the smartphone is already in a correct tilted position (e.g., based on the smartphone indicating that the FOV is correct as positioned), then the decision of step 754 may be "no" and lead to step 758, which includes commencing the outgoing video communication. For example, the smartphone may "call" the commanded video call, thereby facilitating the video communication between one or more remote participants and one or more local participants (e.g., in the same location as the mobile communication device assembly 100).

Method 750 may continue at step 760, which includes tracking one or more local participants during the video communication. For example, in some aspects, the mobile communication device assembly 100 may track one or more local participants by adjusting a FOV of the smartphone during the video communication. This adjustment may occur, in combination with feedback data from the smartphone, for the purpose of ensuring that the FOV of the smartphone is generally focused on a speaker among the local participants. Generally, being focused on the speaker ensures a higher quality of the video communication, and may require that the speaker be a center of focus of the FOV of the smartphone. The tracking in step 760 may include one or more movements and operations of the mobile communication device assembly 100 as previously described with reference FIGS. 8A-8G.

In some aspects, the tracking operation of step 760 is automatic and occurs without user command (e.g., audio command or otherwise). For example, feedback from the smartphone or data determined by the controller 114, such as image recognition feedback, audio feedback, digital focus of FOV feedback, facial recognition feedback, and other feedback, may provide the input data to the controller 114 that is then used to determine output commands from the controller 114 to one or more of the wheel drive assembly 120 or angular adjustment assembly 130. Alternatively, or additionally, the tracking operation of step 760 may use audio commands from a local user (or remote user) of the mobile communication device assembly 100 to perform a particular movement operation. As an example, a local user may speak the command "rotate the smartphone 180 degrees" to initiate a rotational movement shown in FIG. 8B.

Method 750 may continue at step 762, which includes a determination of whether a command has been received to end the video communication. If the determination is "no" then method 750 may continue back to step 760 as previously described. If the determination is "yes" then method 750 may continue at step 764, which includes ending the video communication. The command may be a voice command (e.g., "End call with John Doe") or a physical command (e.g., pushing an end call button on the smartphone).

Method 750 may continue at step 766, which includes operating the angular adjustment assembly 130 to the retracted position. For example, once the video communication on the smartphone ends, the mobile communication device assembly 100 may operate to retract the support member 126 back into the flush position in the recess 128 of the housing 102. By doing so, the mobile communication device assembly 100 (and smartphone) will return to a flat position on the support surface.

Method 750 may also include other steps, either in place of or in addition to the example steps illustrated in FIG. 7B. Such steps may occur prior to step 752, after step 766, or between one or more of the described steps. For example, the mobile communication device assembly 100 may perform one or more diagnostic operations, such as: checking device condition, checking user recognition functionality, checking image analysis functionality, or checking environmental conditions. As another example, the mobile communication device assembly 100 may receive, and perform an operation based on receipt of, a voice command from a user, such as a command to "wake up," "turn on," "turn off," or "end voice call," among others. As another example, additional commands (e.g., by voice of a participant or by visual recognition on the smartphone or assembly) may control the mobile communication device assembly during method 750. These additional commands include, for example, commands to move or adjust a location or tilt of the mobile communication device assembly, commands to instruct the mobile communication device assembly to avoid a particular obstacle on the support surface, or otherwise.

In some aspects, the mobile communication device assembly 100 may have a larger area to move within during method 750 (an outgoing video communication) as compared to method 700 (an incoming video communication). Further, the mobile communication device assembly 100 may have more time to move to an optimal location (e.g., position and angle) during method 750 as compared to method 700. Thus, in some aspects, voice command of the mobile communication device assembly 100 in order to properly position it during method 700 may be more prevalent as compared to during method 750.

Figure 9:
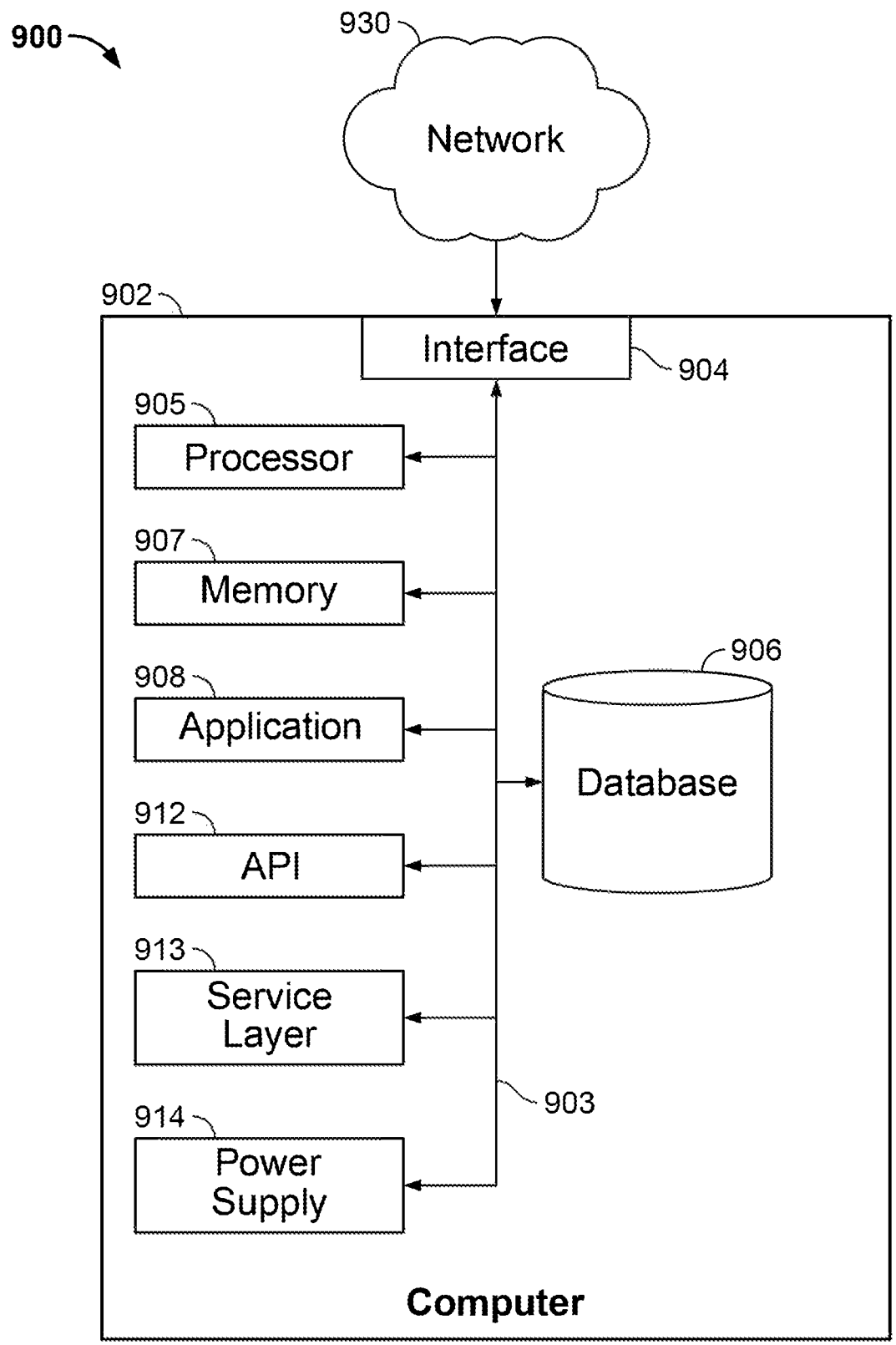
FIG. 9 is a block diagram of an example computer system used to provide computational functionalities associated with described algorithms, methods, functions, processes, flows, and procedures, as described in the instant disclosure, according to an implementation.

FIG. 9 is a block diagram of an example computer system 900 used to provide computational functionalities associated with described algorithms, methods, functions, processes, flows, and procedures, as described in the instant disclosure, according to an implementation. The computer system 900, or more than one computer system 900, can be used to implement the computing nodes described previously in this disclosure, e.g., the mobile communication device assembly.

In some aspects, all or a portion of the computer system 900 represents the controller 114. In some aspects, all or a portion of the computer system 900 represents the controller 114 in combination with the mobile communication device. In some aspects, the computer 902 may comprise a computer that includes an input device, such as a keypad, keyboard, touch screen, or other device that can accept user information, and an output device that conveys information associated with the operation of the computer 902, including digital data, visual, or audio information (or a combination of information), or a graphical user interface (GUI).

The computer 902 can serve in a role as a client, network component, a server, a database or other persistency, or any other component (or a combination of roles) of a computer system for performing the subject matter described in the instant disclosure. The illustrated computer 902 is communicably coupled with a network 930. In some implementations, one or more components of the computer 902 may be configured to operate within environments, including cloud-computing-based, local, global, or other environment (or a combination of environments).

At a high level, the computer 902 is an electronic computing device operable to receive, transmit, process, store, or manage data and information associated with the described subject matter. According to some implementations, the computer 902 may also include, or be communicably coupled with, an application server, e-mail server, web server, caching server, streaming data server, or other server (or a combination of servers).

The computer 902 can receive requests over network 930 from a client application (for example, executing on another computer 902) and respond to the received requests by processing the received requests using an appropriate software application(s). In addition, requests may also be sent to the computer 902 from internal users (for example, from a command console or by other appropriate access methods), external or third-parties, other automated applications, as well as any other appropriate entities, individuals, systems, or computers.

Each of the components of the computer 902 can communicate using a system bus 903. In some implementations, any or all of the components of the computer 902, hardware or software (or a combination of both hardware and software), may interface with each other or the interface 904 (or a combination of both), over the system bus 903 using an application programming interface (API) 912 or a service layer 913 (or a combination of the API 912 and service layer 913). The API 912 may include specifications for routines, data structures, and object classes. The API 912 may be either computer-language independent or dependent and refer to a complete interface, a single function, or even a set of APIs. The service layer 913 provides software services to the computer 902 or other components (whether or not illustrated) that are communicably coupled to the computer 902. The functionality of the computer 902 may be accessible for all service consumers using this service layer. Software services, such as those provided by the service layer 913, provide reusable, defined functionalities through a defined interface. For example, the interface may be software written in JAVA, C++, or other suitable language providing data in extensible markup language (XML) format or other suitable formats. While illustrated as an integrated component of the computer 902, alternative implementations may illustrate the API 912 or the service layer 913 as stand-alone components in relation to other components of the computer 902 or other components (whether or not illustrated) that are communicably coupled to the computer 902. Moreover, any or all parts of the API 912 or the service layer 913 may be implemented as child or sub-modules of another software module, enterprise application, or hardware module without departing from the scope of this disclosure.

The computer 902 includes an interface 904. Although illustrated as a single interface 904 in FIG. 9, two or more interfaces 904 may be used according to particular needs, desires, or particular implementations of the computer 902. The interface 904 is used by the computer 902 for communicating with other systems that are connected to the network 930 (whether illustrated or not) in a distributed environment. Generally, the interface 904 includes logic encoded in software or hardware (or a combination of software and hardware) and is operable to communicate with the network 930. More specifically, the interface 904 may include software supporting one or more communication protocols associated with communications such that the network 930 or interface's hardware is operable to communicate physical signals within and outside of the illustrated computer 902.

The computer 902 includes a processor 905. Although illustrated as a single processor 905 in FIG. 9, two or more processors may be used according to particular needs, desires, or particular implementations of the computer 902. Generally, the processor 905 executes instructions and manipulates data to perform the operations of the computer 902 and any algorithms, methods, functions, processes, flows, and procedures as described in the instant disclosure.

The computer 902 also includes a database 906 that can hold data for the computer 902 or other components (or a combination of both) that can be connected to the network 930 (whether illustrated or not). For example, database 906 can be an in-memory, conventional, or other type of database storing data consistent with this disclosure. In some implementations, database 906 can be a combination of two or more different database types (for example, a hybrid in-memory and conventional database) according to particular needs, desires, or particular implementations of the computer 902 and the described functionality. Although illustrated as a single database 906 in FIG. 9, two or more databases (of the same or combination of types) can be used according to particular needs, desires, or particular implementations of the computer 902 and the described functionality. While database 906 is illustrated as an integral component of the computer 902, in alternative implementations, database 906 can be external to the computer 902.

The computer 902 also includes a memory 907 that can hold data for the computer 902 or other components (or a combination of both) that can be connected to the network 930 (whether illustrated or not). For example, memory 907 can be Random Access Memory (RAM), Read Only Memory (ROM), optical, magnetic, and the like, storing data consistent with this disclosure. In some implementations, memory 907 can be a combination of two or more different types of memory (for example, a combination of RAM and magnetic storage) according to particular needs, desires, or particular implementations of the computer 902 and the described functionality. Although illustrated as a single memory 907 in FIG. 9, two or more memories 907 (of the same or a combination of types) can be used according to particular needs, desires, or particular implementations of the computer 902 and the described functionality. While memory 707 is illustrated as an integral component of the computer 902, in alternative implementations, memory 907 can be external to the computer 902.

The application 908 is an algorithmic software engine providing functionality according to particular needs, desires, or particular implementations of the computer 902, particularly with respect to functionality described in this disclosure. For example, application 908 can serve as one or more components, modules, or applications. Further, although illustrated as a single application 908, the application 908 may be implemented as multiple applications 908 on the computer 902. In addition, although illustrated as integral to the computer 902, in alternative implementations, the application 908 can be external to the computer 902.

The computer 902 can also include a power supply 914. The power supply 914 can include a rechargeable or non-rechargeable battery that can be configured to be either user- or non-user-replaceable. In some implementations, the power supply 914 can include power-conversion or management circuits (including recharging, standby, or other power management functionality). In some implementations, the power supply 914 can include a power plug to allow the computer 902 to be plugged into a wall socket or other power source to, for example, power the computer 902 or recharge a rechargeable battery.

There may be any number of computers 902 associated with, or external to, a computer system containing computer 902, each computer 902 communicating over network 930. Further, the term "client," "user," and other appropriate terminology may be used interchangeably, as appropriate, without departing from the scope of this disclosure. Moreover, this disclosure contemplates that many users may use one computer 902, or that one user may use multiple computers 902.

Described implementations of the subject matter can include one or more features, alone or in combination.

In a first implementation, an mobile communication device assembly includes a housing that comprises an opening configured and sized to support a display screen of a mobile communication device; a controller mounted in the housing and configured to communicably couple to the mobile communication device; and an angular adjustment assembly mounted in the housing and including a first motor electrically coupled to the controller; a first gear assembly driveably coupled to the first motor; and a support member coupled to the first gear assembly and extendable, with the first gear assembly, from a first position flush with the housing to a second position angularly extended from the housing.

The foregoing and other described implementations can each, optionally, include one or more of the following features:

A first feature, combinable with any of the following features, where the first gear assembly includes: a pinion gear driveably coupled to the first motor; a rack gear formed on an internal surface of the housing and engageable with the pinion gear; and a hinge coupled to the pinion gear and the support member and extendable, as the pinion gear is driven by the first motor to traverse the rack gear, to urge the support member from the first position to the second position.

A second feature, combinable with any of the previous or following features, further including a wheel drive assembly mounted in the housing and including: a second motor electrically coupled to the controller; a second gear assembly driveably coupled to the second motor; and at least one wheel connected to the second gear assembly and positioned to extend from the housing to contact the support surface.

A third feature, combinable with any of the previous or following features, where the second gear assembly includes: a worm gear driveably coupled to the second motor; a spur gear engageable with the worm gear; and a transfer member coupled to the spur gear and a shaft of the wheel and configured to transfer rotational movement from the spur gear to the wheel.

A fourth feature, combinable with any of the previous or following features, where the wheel drive assembly comprises a first wheel drive assembly, the mobile communication device assembly further comprising a second wheel drive assembly mounted in the housing and comprising: a third motor electrically coupled to the controller; a third gear assembly driveably coupled to the third motor; and at least one wheel connected to the third gear assembly and positioned to extend from the housing to contact the support surface.

A fifth feature, combinable with any of the previous or following features, where the support member is positioned within a recess of the housing to form a portion of an outer surface of the housing in the first position.

A sixth feature, combinable with any of the previous or following features, further comprising a power-data connection between the mobile communication device and the controller, where the mobile communication device comprises a primary electrical power source of the controller and the first motor.

A seventh feature, combinable with any of the previous or following features, where the power-data connection comprises a USB connection.

An eighth feature, combinable with any of the previous features, further comprising a secondary power source positioned in the housing and electrically coupled to at least one of the controller or the first motor.

In a second implementation, a method for orienting a mobile communication device includes: receiving, at a controller mounted in a housing of a mobile communication device assembly, a command from at least one of a human user or a mobile communication device positioned in the mobile communication device assembly; based on the command, operating, by the controller, a first motor mounted in a housing of the mobile communication device assembly; extending a support member coupled to the first motor through a first gear assembly mounted in the housing from a first position flush with the housing to a second position angularly extended from the housing to contact a support surface; and adjusting an angular separation between the housing and the support surface by extending the support member from the first position to the second position.

The foregoing and other described implementations can each, optionally, include one or more of the following features:

A first feature, combinable with any of the following features, where extending the support member coupled to the first motor through the first gear assembly comprises: rotating a pinion gear coupled to the first motor through operation of the first motor; driving the pinion gear through an arc of a rack gear formed on an internal surface of the housing; extending a hinge coupled to the pinion gear and the support member as the pinion gear is driven by the first motor to traverse the arc of the rack gear; and urging the support member from the first position to the second position by extension of the hinge.

A second feature, combinable with any of the previous or following features, further comprising: receiving, at the controller, another command from at least one of the human user or the mobile communication device; based on the another command, operating, by the controller, a second motor mounted in the housing of the mobile communication device assembly; driving, with the second motor and through a second gear assembly, at least one wheel that extends from the housing to contact the support surface; and moving the mobile communication device assembly on the support surface by driving the at least one wheel.

A third feature, combinable with any of the previous or following features, where driving, with the second motor and through the second gear assembly, at least one wheel comprises: rotating a worm gear coupled to the second motor with the second motor; driving a spur gear engaged with the worm gear; transferring a rotational power from the spur gear to the at least one wheel through a transfer member coupled to the spur gear and a shaft of the at least one wheel; and rotating the at least one wheel with the transferred rotational power.

A fourth feature, combinable with any of the previous or following features, further comprising: based on the another command, operating, by the controller, a third motor mounted in the housing of the mobile communication device assembly; driving, with the third motor and through a third gear assembly, another wheel that extends from the housing to contact the support surface; and moving the mobile communication device assembly on the support surface by driving the another wheel.

A fifth feature, combinable with any of the previous or following features, further comprising: receiving primary electrical power at the controller from the mobile communication device; transferring at least a portion of the received primary electrical power from the controller to the first motor; and receiving data at the controller from the mobile communication device.

A sixth feature, combinable with any of the previous or following features, where the primary electrical power and the data is received through a USB connection between the mobile communication device and the controller.

A seventh feature, combinable with any of the previous features, further comprising transferring secondary electrical power from a power source positioned in the housing to at least one of the controller or the first motor.

In a third implementation, a mobile communication system includes: a mobile communication device assembly that comprises a housing and a pocket formed in the housing; a mobile communication device mounted in the pocket of the housing; a controller mounted in at least one of the housing or the mobile communication device, the controller comprising at least one hardware processor and at least one memory that stores instructions that, when executed by the at least one hardware processor, cause the controller to perform operations including: identifying feedback data from at least one sensor mounted in the housing or the mobile communication device during or prior to a video communication between the mobile communication device and a remote device; determining, based on the feedback data, a first movement operation of the mobile communication device assembly; and based on the determined first movement operation, operating at least one motor mounted in the housing to move the mobile communication device assembly from a first position to a second position on a support surface.

The foregoing and other described implementations can each, optionally, include one or more of the following features:

A first feature, combinable with any of the following features, where the feedback data comprises an indication of a start of the video communication with the remote device, the operations further comprising: determining that the first movement operation comprises an angular adjustment operation; and based on the determination, operating the at least one motor to extend a support member of the mobile communication device assembly that is coupled to the housing from a position flush with the housing to a position extended from the housing to raise at least a portion of the housing away from the support surface.

A second feature, combinable with any of the previous or following features, where the feedback data comprises first feedback data, and the operations further comprise: identifying second feedback data from the at least one sensor mounted in the housing or the mobile communication device at the second location, the second feedback data comprising an indication of an end of the video communication with the remote device; determining, based on the second feedback data, another angular adjustment operation; and based on the determination, operating the at least one motor to retract the support member of the mobile communication device assembly that is coupled to the housing from the position extended from the housing to the position flush with the housing to lower the portion of the housing toward the support surface.

A third feature, combinable with any of the previous or following features, where the feedback data comprises an indication of movement of a participant of the ongoing video communication from a first location to a second location different than the first location, the operations further comprising: determining that the first movement operation comprises a tracking operation; and based on the determination, operating the at least one motor to drive at least one roller that extends from the housing to move the mobile communication device assembly from near the first location to near the second location.

A fourth feature, combinable with any of the previous or following features, where the feedback data comprises first feedback data, and the operations further comprise: identifying second feedback data from the at least one sensor mounted in the housing or the mobile communication device at the second location, the second feedback data comprising data associated with a field of view of a display screen of the mobile communication device; determining, based on the second feedback data, a second movement operation of the mobile communication device assembly; and controlling the at least one motor to perform the second movement operation.

A fifth feature, combinable with any of the previous or following features, where the second movement operation comprises at least one of an angular adjustment operation or a tracking operation.

A sixth feature, combinable with any of the previous features, where the operations further comprise: identifying third feedback data from the at least one sensor mounted in the housing or the mobile communication device between the first location and at the second location, the third feedback data comprising data associated with an obstacle between in a path between the first location and at the second location; determining, based on the third feedback data, a third movement operation of the mobile communication device assembly to avoid contact between the mobile communication device assembly and the obstacle; and controlling the at least one motor to perform the third movement operation.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., or less than 5 secs. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including byway of example, a programmable processor, a computer, or multiple processors or computers. The apparatus can also be or further include special purpose logic circuitry, for example, a Central Processing Unit (CPU), a Field Programmable Gate Array (FPGA), or an Application-specific Integrated Circuit (ASIC). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a ROM or a Random Access Memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto optical disks, or optical disks. However, a computer need not have such devices. Moreover, a computer can be embedded in another device, for example, a mobile telephone, a Personal Digital Assistant (PDA), a mobile audio or video player, a game console, a Global Positioning System (GPS) receiver, or a portable storage device, for example, a Universal Serial Bus (USB) flash drive, to name just a few.

Computer readable media (transitory or non-transitory, as appropriate) suitable for storing computer program instructions and data includes non volatile memory, media and memory devices, including byway of example, semiconductor memory devices, for example, Erasable Programmable Read-Only Memory (EPROM), Electrically Erasable Programmable Read-Only Memory (EEPROM), and flash memory devices; magnetic disks, for example, internal hard disks or removable disks; magneto optical disks; and CD ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a Cathode Ray Tube (CRT), Liquid Crystal Display (LCD), Light Emitting Diode (LED), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a Command Line Interface (CLI) that processes information and efficiently presents the information results to the user. In general, a GUI may include a plurality of User Interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back end, middleware, or front end components. The components of the system can be interconnected by any form or medium of wireline or wireless digital data communication (or a combination of data communication), for example, a communication network. Examples of communication networks include a Local Area Network (LAN), a Radio Access Network (RAN), a Metropolitan Area Network (MAN), a Wide Area Network (WAN), Worldwide Interoperability for Microwave Access (WIMAX), a Wireless Local Area Network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

What is claimed is:

1. A mobile communication device assembly, comprising:
   a housing that comprises an opening configured and sized to support a display screen of a mobile communication device;
   a controller mounted in the housing and configured to communicably couple to the mobile communication device; and
   an angular adjustment assembly mounted in the housing and comprising:
     a first motor electrically coupled to the controller;
     a first gear assembly driveably coupled to the first motor; and
     a support member coupled to the first gear assembly and extendable, with the first gear assembly, from a first position flush with the housing to a second position angularly extended from the housing.

2. The mobile communication device assembly of claim 1, wherein the first gear assembly comprises:
   a pinion gear driveably coupled to the first motor;
   a rack gear formed on an internal surface of the housing and engageable with the pinion gear; and
   a hinge coupled to the pinion gear and the support member and extendable, as the pinion gear is driven by the first motor to traverse the rack gear, to urge the support member from the first position to the second position.

3. The mobile communication device assembly of claim 1, further comprising a wheel drive assembly mounted in the housing and comprising:
   a second motor electrically coupled to the controller;
   a second gear assembly driveably coupled to the second motor; and
   at least one wheel connected to the second gear assembly and positioned to extend from the housing to contact a support surface.

4. The mobile communication device assembly of claim 3, wherein the second gear assembly comprises:
   a worm gear driveably coupled to the second motor;
   a spur gear engageable with the worm gear; and
   a transfer member coupled to the spur gear and a shaft of the wheel and configured to transfer rotational movement from the spur gear to the wheel.

5. The mobile communication device assembly of claim 3, wherein the wheel drive assembly comprises a first wheel drive assembly, the mobile communication device assembly further comprising a second wheel drive assembly mounted in the housing and comprising:
   a third motor electrically coupled to the controller;
   a third gear assembly driveably coupled to the third motor; and
   at least one wheel connected to the third gear assembly and positioned to extend from the housing to contact the support surface.

6. The mobile communication device assembly of claim 1, wherein the support member is positioned within a recess of the housing to form a portion of an outer surface of the housing in the first position.

7. The mobile communication device assembly of claim 1, further comprising a power-data connection between the mobile communication device and the controller, where the mobile communication device comprises a primary electrical power source of the controller and the first motor.

8. The mobile communication device assembly of claim 7, wherein the power-data connection comprises a USB connection.

9. The mobile communication device assembly of claim 7, further comprising a secondary power source positioned in the housing and electrically coupled to at least one of the controller or the first motor.

10. A method for orienting a mobile communication device, comprising:
    receiving, at a controller mounted in a housing of a mobile communication device assembly, a command from at least one of a human user or the mobile communication device positioned in the mobile communication device assembly;
    based on the command, operating, by the controller, a first motor mounted in the housing of the mobile communication device assembly;
    extending a support member coupled to the first motor through a first gear assembly mounted in the housing from a first position flush with the housing to a second position angularly extended from the housing to contact a support surface; and
    adjusting an angular separation between the housing and the support surface by extending the support member from the first position to the second position.

11. The method of claim 10, wherein the extending the support member coupled to the first motor through the first gear assembly comprises:
    rotating a pinion gear coupled to the first motor through operation of the first motor;
    driving the pinion gear through an arc of a rack gear formed on an internal surface of the housing;
    extending a hinge coupled to the pinion gear and the support member as the pinion gear is driven by the first motor to traverse the arc of the rack gear; and
    urging the support member from the first position to the second position by extension of the hinge.

12. The method of claim 10, further comprising:
    receiving, at the controller, another command from at least one of the human user or the mobile communication device;
    based on the another command, operating, by the controller, a second motor mounted in the housing of the mobile communication device assembly;
    driving, with the second motor and through a second gear assembly, at least one wheel that extends from the housing to contact the support surface; and
    moving the mobile communication device assembly on the support surface by driving the at least one wheel.

13. The method of claim 12, wherein the driving, with the second motor and through the second gear assembly, the at least one wheel comprises:
    rotating a worm gear coupled to the second motor with the second motor;
    driving a spur gear engaged with the worm gear;
    transferring a rotational power from the spur gear to the at least one wheel through a transfer member coupled to the spur gear and a shaft of the at least one wheel; and
    rotating the at least one wheel with the transferred rotational power.

14. The method of claim 12, further comprising:
    based on the another command, operating, by the controller, a third motor mounted in the housing of the mobile communication device assembly;

driving, with the third motor and through a third gear assembly, another wheel that extends from the housing to contact the support surface; and moving the mobile communication device assembly on the support surface by driving the another wheel.

15. The method of claim 10, further comprising:

receiving primary electrical power at the controller from the mobile communication device;

transferring at least a portion of the received primary electrical power from the controller to the first motor; and receiving data at the controller from the mobile communication device.

16. The method of claim 15, wherein the primary electrical power and the data is received through a USB connection between the mobile communication device and the controller.

17. The method of claim 15, further comprising transferring secondary electrical power from a power source positioned in the housing to at least one of the controller or the first motor.

* * * * *